(12) United States Patent
McMillan

(10) Patent No.: US 8,622,266 B2
(45) Date of Patent: Jan. 7, 2014

(54) LOAD CARRYING SYSTEM FOR MOTOR VEHICLES

(76) Inventor: Michael McMillan, Caldwell, ID (US)

( * ) Notice: Subject to any disclaimer, the term of this patent is extended or adjusted under 35 U.S.C. 154(b) by 365 days.

(21) Appl. No.: 13/182,373

(22) Filed: Jul. 13, 2011

(65) Prior Publication Data

US 2012/0055967 A1  Mar. 8, 2012

Related U.S. Application Data

(63) Continuation-in-part of application No. 12/962,640, filed on Dec. 7, 2010, now abandoned, which is a continuation of application No. 11/622,353, filed on Jan. 11, 2007, now Pat. No. 7,845,528, application No. 13/182,373, which is a continuation-in-part of application No. 12/174,610, filed on Jul. 16, 2008, now abandoned.

(51) Int. Cl.
  *B60R 9/048* (2006.01)
  *B60R 9/055* (2006.01)

(52) U.S. Cl.
  USPC ............................ 224/323; 224/324; 224/328

(58) Field of Classification Search
  USPC ......... 224/310, 315, 316, 319, 321, 324, 328, 224/42.32, 42.38, 42.39, 42.4, 524, 527, 224/323
  See application file for complete search history.

(56) References Cited

U.S. PATENT DOCUMENTS

| | | | |
|---|---|---|---|
| 2,119,051 A | 5/1938 | Boeuf | |
| 2,784,888 A | 3/1957 | Lecanu-Deshamps | |
| D185,846 S | 8/1958 | Baxter | |
| 2,914,231 A | 11/1959 | Hornke | |
| 2,937,774 A | 5/1960 | Roberts | |
| 3,002,664 A | 10/1961 | Guevara | |
| 3,008,784 A | 11/1961 | Allard | |
| 3,061,256 A | 10/1962 | Feinstein et al. | |
| 3,215,323 A | 11/1965 | Bonitt | |
| 3,253,755 A | 5/1966 | Bott | |

(Continued)

FOREIGN PATENT DOCUMENTS

| | | |
|---|---|---|
| DE | 2621683 | 1/1977 |
| DE | 3814799 | 11/1988 |

(Continued)

OTHER PUBLICATIONS

Photos of "Cheetah Rack" for snowmobiles, product available prior to Jul. 2008.

(Continued)

*Primary Examiner* — Justin Larson
(74) *Attorney, Agent, or Firm* — Pedersen and Company, PLLC; Ken J. Pedersen; Barbara S. Pedersen

(57) ABSTRACT

A load carrier has a flat tray-like body that attaches to a vehicle by load bars. Multiple components may be installed on the tray body in many locations on the tray body, for containing and/or supporting cargo. One component is a cargo container that is captured and locked in one of several possible positions on the tray body. Other components are cargo posts that include one or more upending towers for supporting cargo by capturing generally vertical portions of the cargo between the towers, wherein the cargo posts may be non-pivotal, pivotal, slidable and/or adjustable. Another component is a hooked or curved depending assembly that suspends cargo from the edges of the tray body.

18 Claims, 15 Drawing Sheets

(56) References Cited

U.S. PATENT DOCUMENTS

| | | | |
|---|---|---|---|
| 3,531,006 | A | 9/1970 | Farchmim |
| 3,581,962 | A | 6/1971 | Osborn |
| 3,670,934 | A | 6/1972 | Kraselsky |
| 3,722,765 | A | 3/1973 | Binding |
| 3,776,437 | A * | 12/1973 | Carney ............... 224/406 |
| 3,951,320 | A | 4/1976 | Bott |
| 4,084,735 | A | 4/1978 | Kappas |
| 4,247,026 | A | 1/1981 | Heifner et al. |
| 4,317,534 | A | 3/1982 | Louw |
| 4,350,471 | A | 9/1982 | Lehmann |
| 4,362,258 | A | 12/1982 | French |
| D269,667 | S | 7/1983 | Taylor et al. |
| 4,419,872 | A * | 12/1983 | Plifka .................. 70/18 |
| 4,433,804 | A | 2/1984 | Bott |
| 4,483,471 | A | 11/1984 | Prosen |
| 4,538,737 | A * | 9/1985 | Delaney ............ 211/71.01 |
| D295,620 | S | 5/1988 | Littrell |
| D297,629 | S | 9/1988 | Breger |
| D297,630 | S | 9/1988 | Breger |
| D297,631 | S | 9/1988 | Breger |
| 4,974,766 | A | 12/1990 | DiPalma et al. |
| 5,181,639 | A | 1/1993 | Kvanna |
| 5,236,114 | A | 8/1993 | Bergquist |
| 5,560,525 | A | 10/1996 | Grohmann et al. |
| 5,560,526 | A | 10/1996 | Jantzen et al. |
| 5,615,818 | A | 4/1997 | Linden |
| 5,746,364 | A | 5/1998 | Stengrim |
| 5,791,429 | A | 8/1998 | Bergman |
| D412,881 | S | 8/1999 | Behringer |
| D422,553 | S | 4/2000 | VonDuyke |
| 6,056,176 | A | 5/2000 | Aftanas et al. |
| 6,425,508 | B1 | 7/2002 | Cole et al. |
| D462,312 | S | 9/2002 | Klein |
| 6,581,813 | B2 | 6/2003 | Bove et al. |
| 6,698,635 | B1 | 3/2004 | Brown |
| 6,736,300 | B2 * | 5/2004 | Deakin ............... 224/319 |
| 6,749,036 | B1 | 6/2004 | Schrapp et al. |
| 6,863,199 | B2 | 3/2005 | Child |
| 6,920,952 | B2 | 7/2005 | Bertrand et al. |
| 7,011,173 | B2 | 3/2006 | Cadotte et al. |
| 7,011,239 | B2 | 3/2006 | Williams |
| 7,025,161 | B2 | 4/2006 | Bertrand et al. |
| 7,044,526 | B2 | 5/2006 | Tweet et al. |
| 7,051,909 | B2 * | 5/2006 | Gibson ................ 224/403 |
| 7,156,272 | B2 | 1/2007 | Dean |
| 7,165,702 | B1 | 1/2007 | Billberg |
| D572,065 | S | 7/2008 | Noble |
| 7,845,528 | B2 * | 12/2010 | McMillan ............ 224/328 |
| 8,113,397 | B2 * | 2/2012 | Magnusson .......... 224/324 |
| 8,136,708 | B2 * | 3/2012 | Sautter et al. ......... 224/321 |
| 2004/0134952 | A1 | 7/2004 | Crepeau et al. |
| 2004/0232182 | A1 | 11/2004 | Ingram |
| 2006/0163296 | A1 | 7/2006 | McMillan |
| 2006/0237502 | A1 | 10/2006 | Tweet et al. |
| 2006/0243767 | A1 | 11/2006 | McMillan |
| 2006/0243770 | A1 * | 11/2006 | Kortbein et al. ....... 224/547 |
| 2006/0261111 | A1 | 11/2006 | McCoy et al. |
| 2007/0045368 | A1 * | 3/2007 | Lavelle ............... 224/524 |
| 2008/0169322 | A1 | 7/2008 | Mcmillan |
| 2008/0272165 | A1 | 11/2008 | McMillan |
| 2011/0303711 | A1 | 12/2011 | McMillan |
| 2013/0193176 | A1 * | 8/2013 | Khoo ................. 224/324 |

FOREIGN PATENT DOCUMENTS

| | | |
|---|---|---|
| FR | 2581943 | 2/1986 |
| FR | 2570336 | 3/1986 |
| JP | 08324350 | 12/1996 |
| WO | 8600584 | 1/1986 |
| WO | 9108929 | 6/1991 |

OTHER PUBLICATIONS

Photo of "Escalator Cargo Rack" for snowmobiles, product available prior to Jul. 2008.

Photos of "Knight Rider" rack, product available prior to Jul. 2008.

Photos of "IQ Edge Touring" rack, product available prior to Jul. 2008.

Photos of "Powder Rack" for snowmobiles, product available prior to Jul. 2008.

Photo of "Tamarack ATV Rack", product available prior to Jul. 2008.

Photo of "Twisted Metal Racing" rack, product available prior to Jul. 2008.

Photos of "X-Rack", product available prior to Jul. 2008.

* cited by examiner

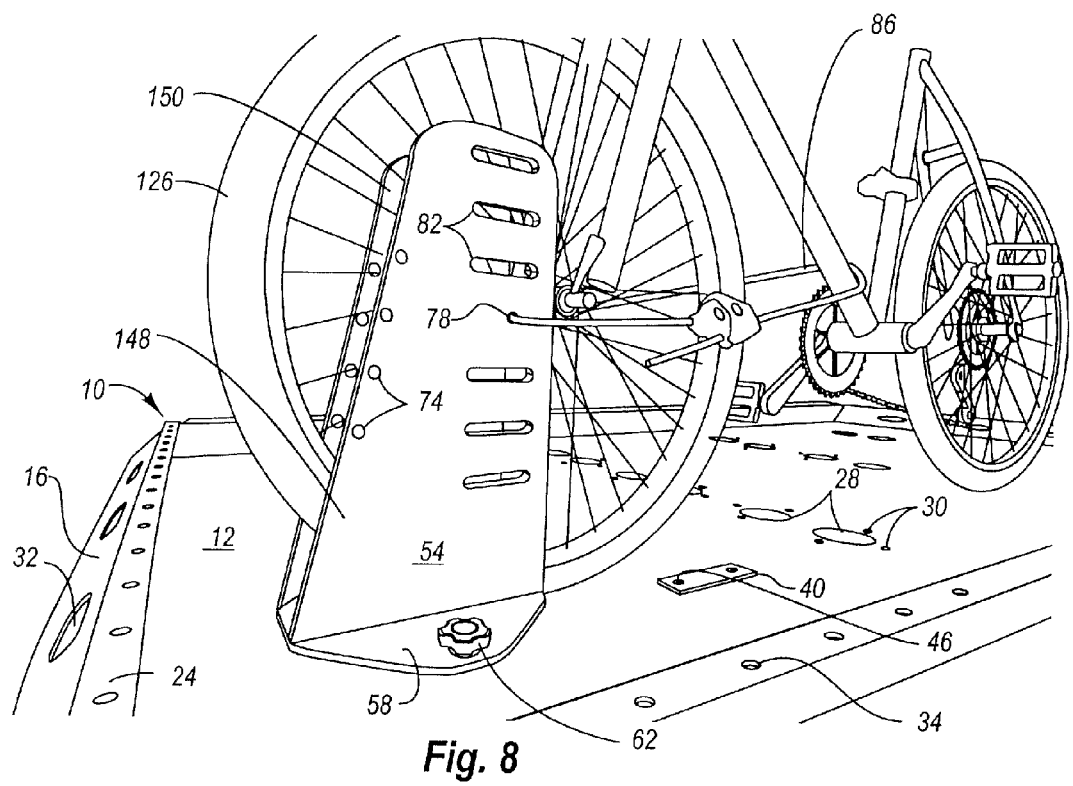
Fig. 8
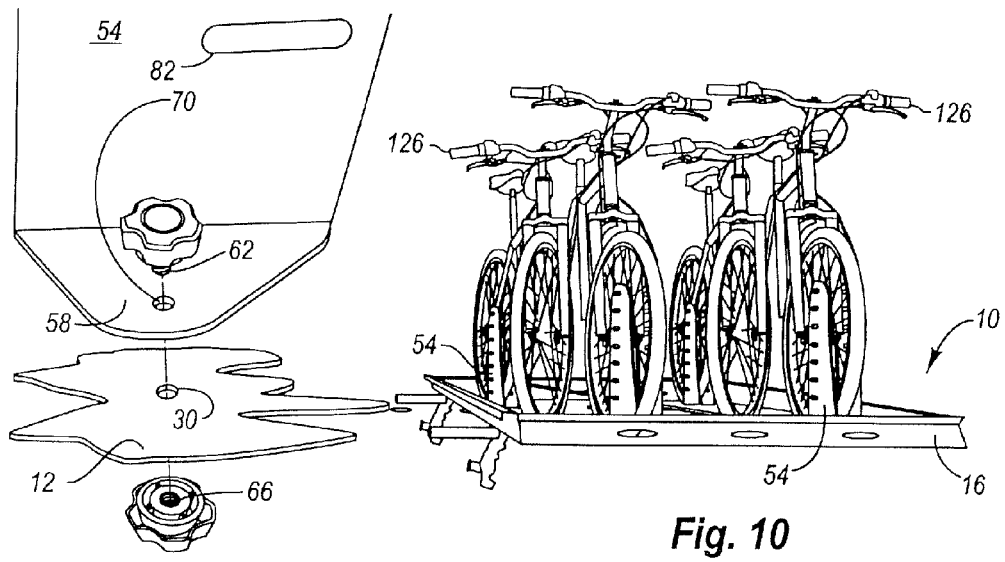
Fig. 9
Fig. 10

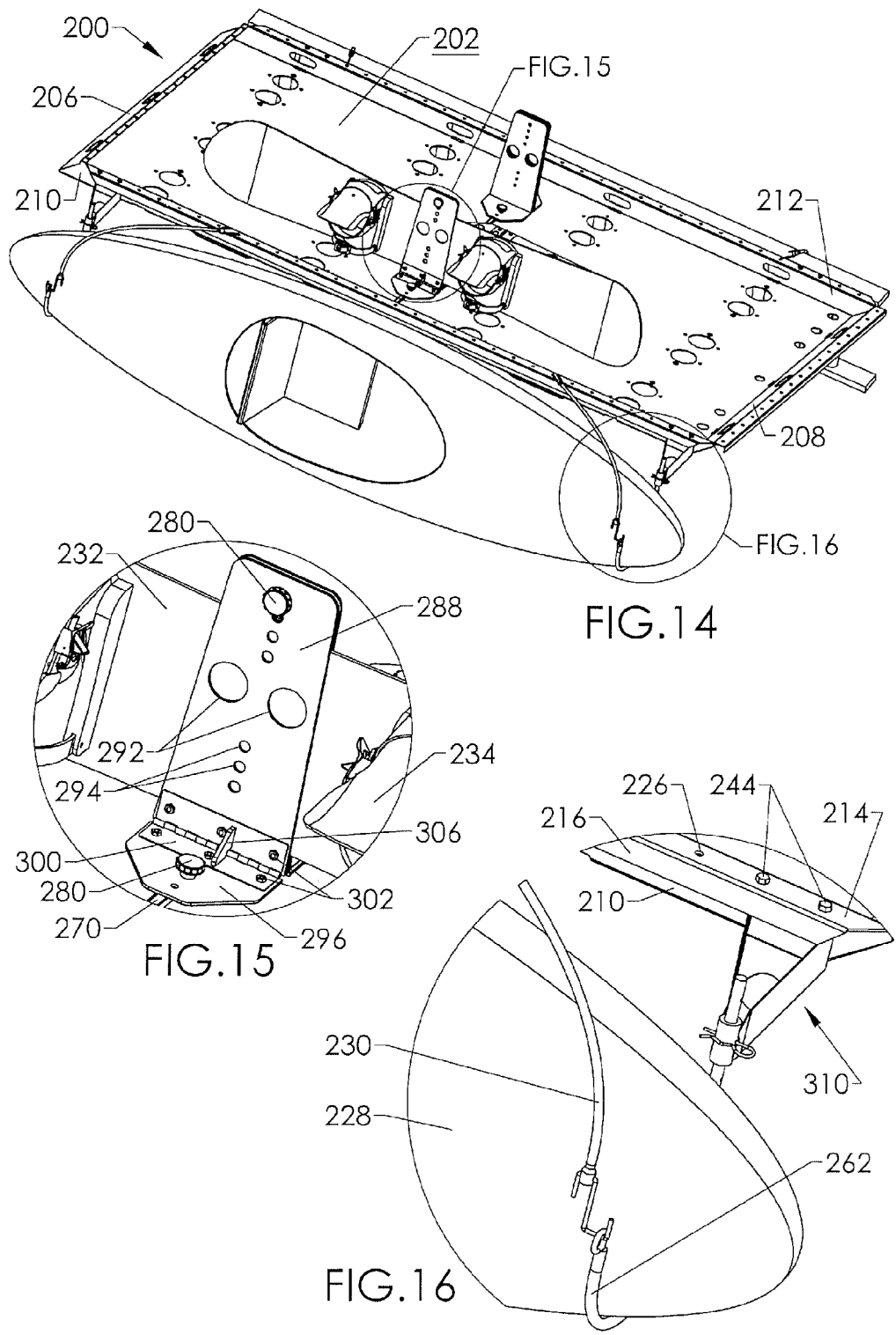

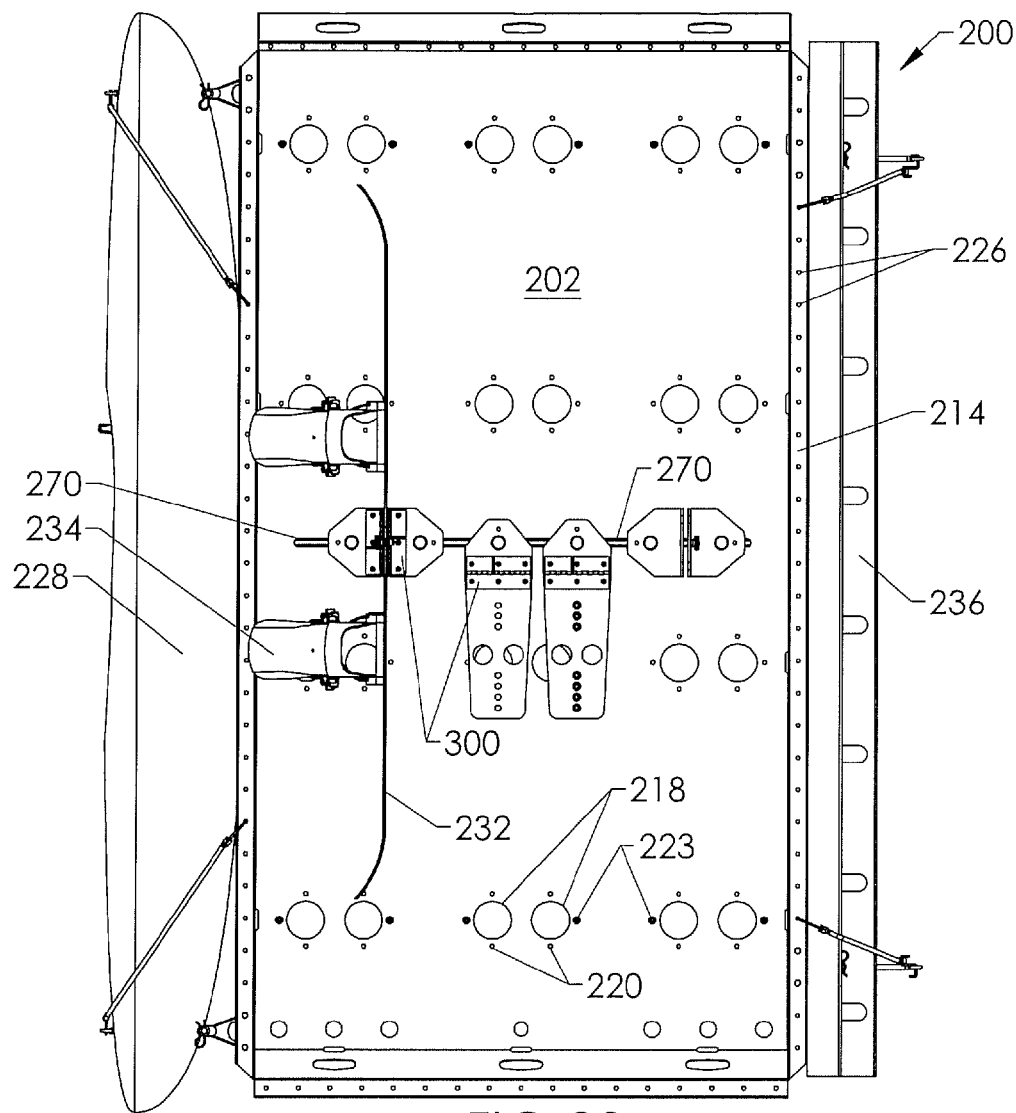
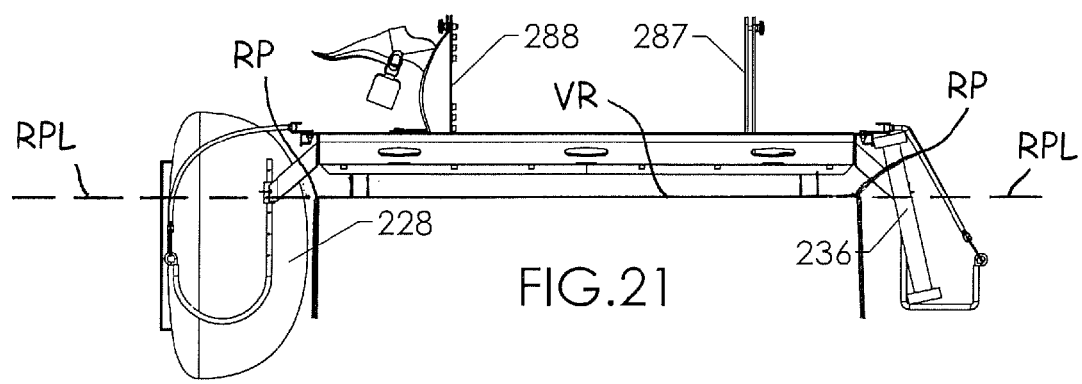

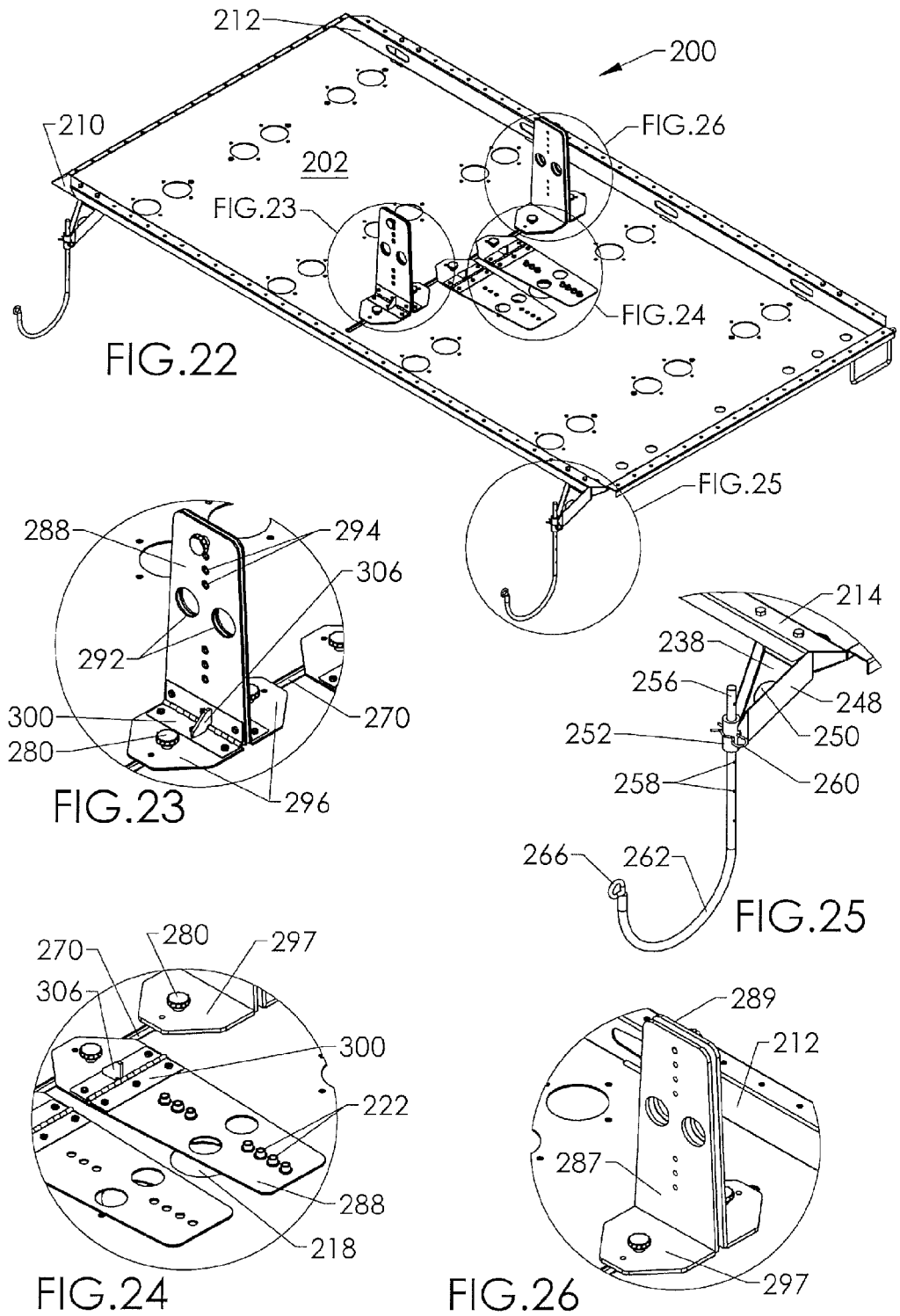

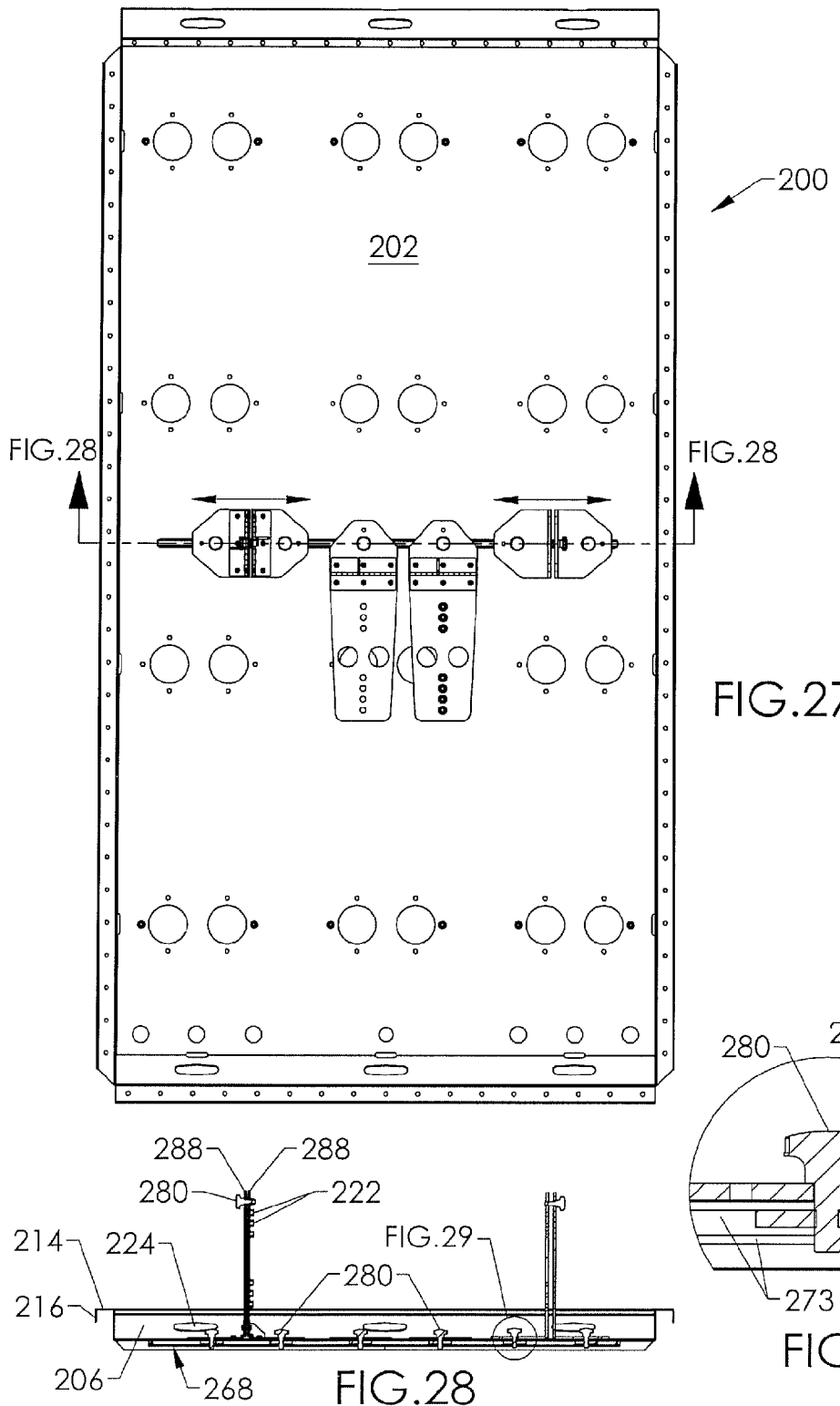

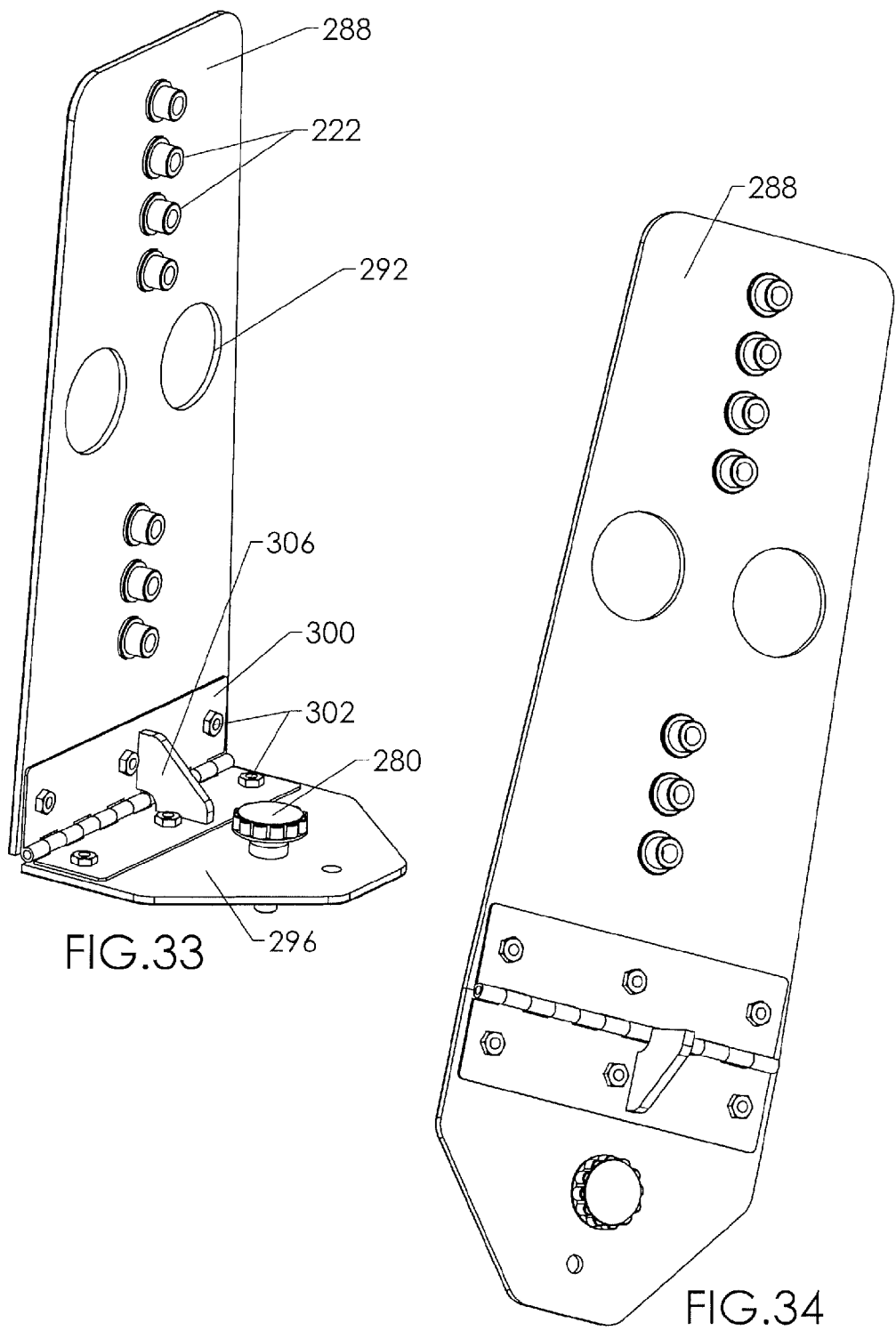

LOAD CARRYING SYSTEM FOR MOTOR VEHICLES

This application is a continuation-in-part of prior non-provisional application Ser. No. 12/962,640, filed Dec. 7, 2010 and entitled "LOAD CARRYING SYSTEM FOR MOTOR VEHICLES", now abandoned, which is a continuation of U.S. Non-Provisional application Ser. No. 11/622,353, filed Jan. 11, 2007, and issuing Dec. 7, 2010 as U.S. Pat. No. 7,845,528, the entire disclosures of which are incorporated herein by this reference. This application is also a continuation-in-part of non-provisional Ser. No. 12/174,610, filed Jul. 16, 2008, now abandoned, the entire disclosure of which is incorporated herein by this reference.

FIELD OF THE INVENTION

The present invention relates to a load carrying system mounted to cargo load bars of a motor vehicle, such as rooftop load bars, truck-bed bars (pick-up or otherwise), and/or other cargo support structure that is provided on the exterior of a vehicle. More specifically, the invention is a load carrying system comprising a four-sided pan or tray-shaped load carrier body designed as a template for inter-fitting modular components, such as cargo containers and cargo posts.

BACKGROUND OF THE INVENTION

Many motorists depend upon their vehicles to support their livelihoods as well as their lifestyles, whether making a cross-town commute, conducting daily business, traveling long distance, or pursuing weekend recreation.

When the passenger compartment and interior of a vehicle has reached its cargo-carrying limit, or the motorist wishes to routinely transport a wide variety of cargo items, many motorists turn to their vehicle's rooftop or truck-bed exterior cargo-carrying capabilities to meet their needs. These situations can include transport of industrial, utility or construction equipment, such as toolboxes, large tools, ladders, lumber, plumbing pipes, buckets, or carrying bulky personal items such as luggage, furniture, boxes, bags, and recreational equipment, including bicycles, skis, kayaks, canoes, surfboards, windsurfing and other oddly-shaped, oversized apparatus.

Odorous, wet or soiled cargo items are also commonly transported on vehicle rooftops or in or above a truck-bed, for example. These items include spare vehicle tires, tire jacks, automotive accessories, fuel cans, large coolers, power tools, heavy clothing, wetsuits, fishing gear, and related sports equipment.

Over the years, a number of external cargo-carrying systems and styles have been created for vehicles for different cargo-carrying needs. One or more load bars mounted to vehicle rooftops, camper tops, or truck-beds, for example, enable motorists to secure various cargo items, such as ladders and lumber, directly to these load bars, supporting the cargo above the vehicle or camper exposed rooftop, or above the truck-bed, for example.

Some styles of load bars are factory-installed, while others are custom-mounted on vehicle rooftops or above a truck-bed. Load bars can vary in size, shape, load-bearing capacity, rooftop/truck-bed placement, mounting hardware, style and design. Load bars also enable motorists to attach a variety of available cargo carrying systems and components to the load bars and their vehicles. Load bars typically span the length and/or width of a vehicle rooftop surface, or the length and/or width of the truck-bed. Affixed to each end of a load bar is a load bar foot mounted to the vehicle rooftop or truck-bed walls and/or floor, using bolts, pins, rivets, clasps, hooks or other fasteners.

Heavy duty, construction, service and industrial application racks are generally open frame, scaffold-style beams or similar structures, mounted into pickup beds to allow overhead loading, transport, and unloading of long, heavy items such as ladders, plumbing materials, lumber and plywood.

For service industry and construction workers, toolboxes and gearboxes are often mounted in pickup beds. Trucks and vans, such as contractor, plumbing, and utility service vehicles, are commonly customized to include side-opening doors configured into locker style compartments incorporated within the vehicle. This arrangement allows the user easy access to tools, toolboxes, hardware and other equipment.

For travel and recreational enthusiasts, and those motorists seeking a variety of cargo-carrying solutions, many roof/truck-bed rack systems depend upon cargo specific mounts or components, such as bicycle mounts, ski mounts, and watercraft mounts, attached by a bracket or clamp to the roof/truck-bed load bars of their vehicles. Cargo specific components, when mounted to a vehicle's load bars, are designed to suspend specific cargo items above a vehicle's rooftop or above a vehicle's truck-bed. Motorists then load and secure and/or lock cargo items to these components directly, using customized locking mechanisms or conventional tie-down devices, such as ropes, straps, and bungee hooks.

With many cargo-carrying systems, separate mounts are designed for different cargo items such as bicycles, skis, snowboards, kayaks, canoes, surfboards, and fishing poles. Most specialized components include a combination of moving parts in their design, which can be difficult to manipulate in cold temperatures.

Another popular load carrier is the enclosed cargo container, which is also mounted directly to the roof/truck-bed load bars of vehicles. Cargo containers can be detached from vehicle load bars when not in use, or they can be left locked in place. Mounting and dismounting of these containers generally depends upon brackets and clamps mounted to the interior floor panel of the containers. This process is substantially easier when the container is first emptied of its cargo contents.

Cargo containers generally include one large top access door with a hinging mechanism on one side, however, the cargo container may comprise one or more doors on said top side for access to the interior of said cargo container. Cargo containers can be square shaped, or curved in pursuit of more aerodynamic function and stylized appearance.

Some load carriers are open structures in more or less basket style configurations. These can have wire sides or tubular or rod pieces jointed together to form a basket shaped, open top structure. The open nature of the basket design allows for transport of bulky items such as fuel cans, spare tires, boxes, furniture and bags.

Various cargo-specific components are also available, designed to attach directly to basket-style load carriers, including individual mounts for bicycles, skis, snowboards, kayaks, canoes, surfboards, and fishing poles. When cargo is secured to these mounts, cargo items are suspended above the basket, limiting available cargo space within the basket itself. Straps from gear or duffel bags, backpacks, and smaller, odd shaped items can slip through the floor and sides of basket style load carriers, potentially coming into contact with and damaging surfaces of the vehicle.

Some load carriers are pan or tray-shaped, with four short sidewalls and generally solid floor panels. The open configuration of a pan or tray-style load carrier enables the user to carry mixed loads of bags, boxes, or other bulky items, reducing the possibility of cargo items contacting the vehicle's surfaces. The user secures cargo items directly to the load carrier floor panels, rails and fixed anchor points, including eyelets and hardware that commonly protrude from the load carrier pan. Securing cargo loads requires tie-down devices such as straps, ropes, cargo netting, tarps and bungee hooks.

The load carriers and cargo systems described above have certain limitations, and a different type of vehicle-exterior load carrying system is needed to solve problems with the structures and/or the use of the prior art, and to fill many needs. The invented system meets many or all needs.

Objects, advantages and novel features of the invention will be set forth in part in the description which follows and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

The invention comprises a pan/tray-shaped load carrier body designed as a template for inter-fitting modular components, optimizing available vehicle-exterior cargo space and enabling the user to safely and routinely transport a wide range of cargo items on a vehicle roof-top, on a truck or pick-up bed, and/or on any support bars/structure that is conventionally provided in or on a vehicle. The inter-fitting modular components may comprise upending cargo posts, a cargo container, and/or a bracket or hook depending from an edge of the pan/tray-shaped load carrier body. The cargo posts may be slidable in a track system, and/or otherwise adjustable relative to each other, and/or pivotal to a flattened storage position, for increasing versatility of the invention. The cargo container may be interfit with the load carrier body by mating walls at the front and/or the rear of the system, and may be removable and preferably rollable on a ground (including a road, concrete, or other surface).

The cargo posts may secure many different pieces of cargo to the pan/tray-shaped load carrier body, for example, a bicycle in an upright orientation with both bicycle wheels left intact and installed on the bicycle. Transporting a bicycle upright protects its moving parts and paint, and transporting a bicycle with both wheels intact and installed eliminates cumbersome wheel removal and wheel reattachment by the user. Cargo posts may also be designed to accept skis, snowboards or other large, long items, including lumber and plumbing pipes. Items may be secured or locked to one cargo post, or multiple cargo posts used in conjunction or alignment with one another, configured and mounted within the load carrier. The cargo post can secure many types and sizes of cargo items, enabling the user to transport a variety of cargo without switching components. In alternative approaches to carrying a bicycle with the wheels still mounted on the bicycle, users may chose to remove the bicycle wheels and utilize a fork mount block to hold and stabilize the bicycle, which fork mount block may be attached to the invented load carrier in various locations on the pan/tray-shaped load carrier body, for example. Fork mount blocks are well-known and available commercially, and may be installed on the load carrier body by bolts or other fasteners, for example.

The versatility of the invention may also, or instead, be enhanced by use of one or more hooked or curved assemblies that depend from one or more side edges or the tray/pan ("body"). These depending assemblies may be used to suspend objects from one or more side edges of the body of the device. For example, a single assembly may be used to suspend one or more objects, but more frequently, two assemblies will be used to suspend opposite ends of an elongated object such as a ladder or a surfboard, and thus, to suspend the entire object.

The preferred tray/pan, cargo posts, cargo container, and/or depending assemblies, may be configured relative to each other at the user's discretion, or readily detached from each other. Removing the cargo posts and cargo container from the load carrier body (tray/pan) will leave the load carrier body empty, low profile, and ready to transport larger, bulky items such as sports equipment, fuel cans, spare tires, tools, furniture, bags and boxes.

Further objects of the invention, and features of the preferred embodiments, and will be apparent after reading the description of the drawings and the preferred embodiments, included hereafter in this document.

BRIEF DESCRIPTION OF THE DRAWINGS

FIG. 8 is a side perspective view of a bicycle mounted on the load carrier body by one embodiment of a cargo post, wherein this cargo post includes two upending towers connected together at their bottom ends at their bottom ends.

FIG. 9 is a close-up perspective view of the base plate of the cargo post of FIG. 8, wherein mounting knobs fasten the cargo post to the load carrier body floor panel.

FIG. 10 is a front perspective view of the load carrier body of FIGS. 1-4, 8 and 9, with four of the two-tower cargo posts of FIGS. 8 and 9 supporting four bicycles.

FIG. 14 is a top perspective view of an alternative load carrier system, in use securing a kayak and a ladder on rail bracket assemblies, and with cargo posts secured to the load carrier floor panel. One cargo post assembly is holding a snowboard and one is upending from the floor panel but is not holding/supporting any cargo.

FIG. 15 is a close-up, detail view of a portion of the embodiment, circled in FIG. 14, showing the cargo post base plate secured to the load carrier floor panel using a floor panel track assembly and hand-tightening bolts.

FIG. 16 is a close-up, detail view of a portion of the embodiment, circled in FIG. 14, wherein one end of a kayak is attached to the load carrier using a rail bracket assembly with J-shaped hooks/cradles and attachment cord.

FIG. 20 is a top view of the load carrier system of FIGS. 14-19.

FIG. 21 is an end view of the load carrier system of FIGS. 14-20, showing rail bracket assemblies on either side of the load carrier, supporting a kayak and a ladder. The rail bracket assemblies extend outward and away from the load carrier, that is, beyond the footprint of the load carrier body (platform).

FIG. 22 is a top perspective view of the embodiment of FIGS. 14-21, with kayak, ladder and snowboard removed.

FIG. 23 is a close-up, detail view of a portion of the embodiment of FIG. 22, showing details of an upending cargo post connected to the floor panel by a track assembly by a hand-tightened bolt. The hinged towers are held upright using the hinge stop tab, and are mated with a hand-tightened bolt.

FIG. 24 is a close-up, detail view of a portion of the embodiment of FIG. 22, featuring the downwardly-pivoted cargo post towers.

FIG. 25 is a close-up, detail view of a portion of the embodiment of FIG. 22, featuring a J-shaped-hook rail bracket assembly.

FIG. 26 is a close-up, detail view of a portion of the embodiment of FIG. 22, featuring two cargo posts, each having a non-pivoting cargo post tower rigidly fixed to a respective base plate.

FIG. 27 is a top view of the embodiment of FIG. 22, wherein three pairs of cargo posts are attached to the load carrier floor panel at their base plates, the cargo posts being slidable and positionable along and fastened to a track assembly mounted to the load carrier body underside and spanning the breadth of the floor panel. This view illustrates how the left pair of cargo posts are the pivotal-tower type with towers held in the upright orientation, the center pair of cargo posts are also the pivotal-tower type with the towers swung downward to be flat against the floor panel, and the right pair of cargo posts are the non-pivotal-tower type so that the towers remain in an upright orientation.

FIG. 28 is an end view of the load carrier system shown in FIG. 27.

FIG. 29 is a close-up, detail view of a portion circled in FIG. 28, detailing the floor panel track assembly. A cargo post base plate is attached to the load carrier floor panel using a hand tightened bolt, which is shown protruding through the bolt carriage body, past the underside of the load carrier track assembly channel and assembly.

FIG. 33 is a perspective view of load carrier cargo post tower in an upright position, with nutserts, hinge assembly, stop tab and hand tightened bolt.

FIG. 34 is a perspective view of the load carrier cargo post tower of FIG. 33, pivoted to a flat position.

DESCRIPTION OF THE PREFERRED EMBODIMENTS

Figures 1A, 1B, 2, 3:
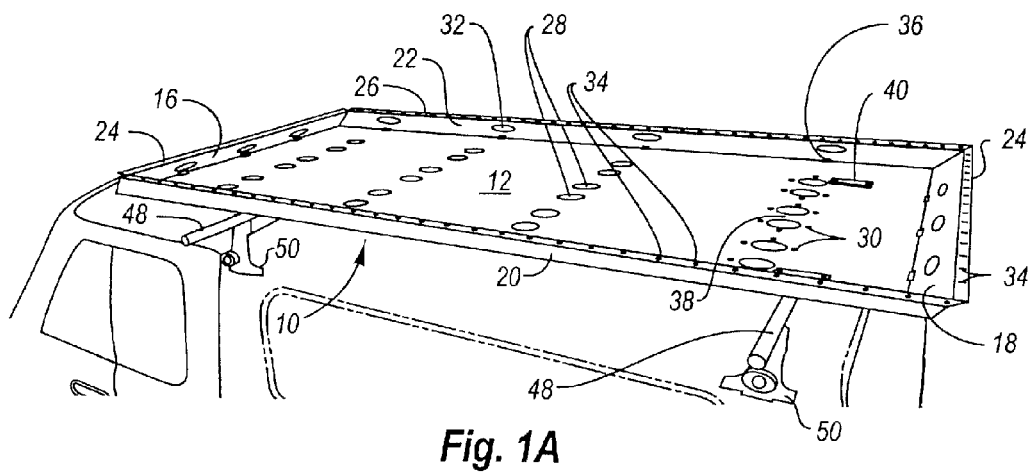
FIG. 1A is a top and side view of one embodiment of the load carrier body.
FIG. 1B is a partial, front perspective view of the load carrier body of FIG. 1A.
FIG. 2 is a close-up perspective view of the mounting brace assembly, provided on the underside of the load carrier body of FIGS. 1A and 1B, for attaching the load carrier body to a vehicle's load bars.
FIG. 3 is a bottom, side perspective view of a portion of the load carrier body of FIGS. 1(A and B) and 2, including a reinforcing beam structure called a "hat channel".

The load carrying system of the invention is configured for attachment to the load bars or other exterior cargo-carrying structure of motor vehicles, including pickups, vans and SUVs. These conventional load-bars or other exterior cargo-carrying structures are typically mounted to a roof of a vehicle, a roof of a camper, or to the floor and/or sides of a pick-up bed (to form a standing structure that upends from the truck-bed to a level above the upper walls/perimeter of the truck-bed). Such a vehicle would typically be one on which rooftop load bars or truck-bed bars/supports are already attached. These can be reinforced, after-market bars/supports made for attachment to vehicles for carrying cargo. Such bars/supports can also be factory mounted during the construction of the vehicle.

Load bars are generally mounted on the rooftop area above passenger compartments of vehicles, or on uprights that are installed in/on a truck-bed. They can also be mounted to camper tops covering the truck-beds of pickups, or mounted in a combination of these locations.

The load carrier body of the preferred embodiment, also called herein a "tray", "pan", or "platform", is mounted to vehicle load bars by affixing braces, brackets, clamps or u-bolts around the vehicle load bars, and attaching said braces, brackets, clamps or u-bolts to the underside of the load carrier body. Customized or conventional fasteners such as bolts and nuts can be used. A variety of customized clamps are commonly available and designed to fit around load bars of different vehicles. The load carrier body may also be attached to vehicle load bars using straps, rope, or other secure tie-down devices.

The preferred load carrier body includes a "floor panel" (which is the large, main top platform surface of the body), and four generally-upending walls, from 2-12 inches in height. The load carrying body is pan or tray-shaped, having a generally flat, planar floor panel that is generally continuous, with the exception of apertures or passages for attachment or strapping of components or cargo. Two side walls upend from right and left side edges of the floor panel, and attach to front and rear walls where they abut generally at the four corners of the floor panel.

The front and rear end walls are preferably positioned at supplementary angles to each other relative to the flat panel of the load carrying body, to deflect the wind, and to position cargo items in place. For example, the front end wall of the load carrier body is preferably slated rearward over the front edge of the load carrying body floor panel, so that it is at 30 degrees to said floor panel. For example, the rear end wall is preferably slated rearward away from the rear edge of the floor panel, so that is may be described as 150 degrees from the floor panel. Thus, these two angles add to 180 degrees, or, are supplementary to each other.

Another way to describe the front and rear end walls is that they are both sloped/slanted rearward, relative to the plane of the floor panel, for example, sloped/slanted rearward to be 25-60 degrees relative to the plane of the floor panel. Because the floor panel is typically generally horizontal when installed, one could describe the front and rear end walls are sloping/slanted rearward at 25-60 degrees to horizontal. The slanted/sloping front end wall and rear end wall of the load carrier body serve to secure modular components in place, such as a cargo container. This slanted/sloping design also reduces wind friction on the load carrier body.

Apertures or "passages" are provided, preferably throughout the load carrier body, including the floor panel, side walls, and end walls. The design and placement of the passages throughout the load carrier body serve as mounting locations for accessories such as load-securing components, including an inter-fitting cargo container and/or cargo posts and/or bracket/hook assemblies that depend from one or more edges of the device. The passages are designed to receive, and preferably allow locking of, the load-securing components to the load carrier body. The passages are designed to accept rigid tabs, shafts, or bolts, that are built into or other provided with the inter-fitting modular components. Also, the passages may be used for threading, looping or otherwise securing conventional cargo tie-down devices such as straps, ropes and bungee hooks. Also, the passages function as water, ice and snow drainage sites and attachment sites.

In the preferred embodiment, passages are circular or oval in shape, to reduce pinching of cargo tie-down devices such as straps or webbing routed or looped through said passages. These passages are generally between 1/8 inch and 5 inches in diameter, which are small passages/apertures compared to the dimensions of the flat floor panel. Therefore, it may be noted, the preferred load carrying body floor panel and walls are more solid and continuous than a grate, mesh, or frame, and will tend to be more rigid and strong than grates, mesh, or frame systems.

A lip or "flange" portion may extend from the upper edge of the upending left and right side walls and/or rear and front end walls, so that the lip/flange is oriented to be horizontal when the device is installed on a vehicle. The lip/flange of one or more of the walls may comprise apertures for connection of depending assemblies, ties, straps, bungee-cords, or other fasteners or attachments.

Preferred inter-fitting cargo components comprise a cargo container, a cargo post(s), and depending suspension assemblies. These cargo components may include interfitting rigid tabs and/or fasteners that fit through the passages cut throughout the load carrier body along its floor panel, front end, rear end, or side walls, allowing for connection of the cargo components, and hence cargo, in multiple locations in/on the load carrier body. Once protruding through a chosen passage, a tab and/or fastener may be secured and locked into place with a padlock, pin or locking mechanism. Other attachment mechanisms may be used for said cargo container, cargo post, and/or suspension assemblies, as will be understood later in this document.

The removable cargo container offers a versatile, portable alternative to many conventional cargo containers. The preferred cargo container incorporates hinged top and side doors, allowing access to the top, left and right sides of the container, depending upon which side of the load carrier body, and the vehicle, the container is positioned. The container can include removable drawers and cargo space separators, and a removable tote wheel assembly for maneuvering the cargo container when it is not attached to the load carrier body.

The preferred cargo container has four sides, a top and a bottom. The cargo container fits securely within the load carrier body by abutting under the load carrier front end wall, preventing forward movement of the container, while also abutting the load carrier rear end wall, where the container is locked into place. The front lower end panel, also called the nose, of the cargo container, fits securely under the load carrier body front end wall, preventing forward movement of the container and/or upward swinging of the front of the container, relative to the load carrier body. The rear lower end panel of the cargo container abuts against, and is contoured/shaped to mate or "inter-fit" with, the load carrier body rear end wall, also serving to position the cargo container in place.

Once in position, a rigid tab mounted on the exterior of the cargo container lower rear end panel may be provided, which tab may protrude through the load carrier body rear end wall at one of several passages along the load carrier body rear end wall, enabling the user to secure and lock the cargo container into place relative to the carrier body using a padlock or pin. A snug or tight-fitting lock system, with the length of the tab designed appropriately, may prevent upward pivoting of the rear end of the cargo container. Thus, the cargo container is constrained from forward, rearward, or upward movement relative to the load carrying body, as it is captured at its front end by the interfitting shapes of the cargo container and the front wall, and locked at its rear end by the interfitting shapes and lock of the cargo container and the rear end. These interfitting shapes and lock systems will also inhibit or prevent lateral movement of the cargo container, but additional tabs and locks, and/or bolts, straps or other fasteners, may be used to further prevent lateral or other movement, if desired.

The cargo container rear lower tab also may accept a removable tote wheel assembly with a rigid suspension, enabling the user to more easily maneuver the cargo container when it is dismounted from the load carrier body. The tote wheel assembly attaches to the tab mounted on the container's rear end panel using a bolt or pin mechanism.

Depending upon materials used in the construction of the load carrying system, and its preferred components, including aluminum, steel, or high impact plastic, for example, the design and function of system and the components will serve different load carrying capacities and cargo needs. For example, a cargo container made of steel or aluminum can be configured to function as a removable equipment box, locking power tools and fuel cans safely within, yet still outside of, the user's vehicle. A cargo container molded from high impact plastic that is lighter in weight is designed for recreational cargo, such as sports equipment, basic tools and automotive accessories. The cargo container may include a combination of removable and configurable cargo drawers and cargo space separators within the cargo container.

The multiple passages on the load carrier rear end wall enable the user to choose which side of their vehicle to attach the cargo container, and from which side they will access cargo items within the container. This can be the left, center, or right side of the load carrier and the vehicle. For example, in an urban area, the user can position the cargo container on the passenger (sidewalk) side of the load carrier and their vehicle, accessing cargo safely away from traffic.

Side access doors are mounted within the cargo container side walls and include a hinge, allowing the access door to suspend above a side wall of the load carrier, creating a flat workspace and cargo staging platform for the user. Side access doors of the container are held open by restraints such as chains or cables mounted to either or both interior end surfaces of a side access door. Depending upon which side hinges are located, one or more top access doors of the cargo container will open toward the left or right side of the container.

Cargo container top access doors are held open by restraints such as chains or cables mounted to either or both interior end surfaces of a top access door, or more preferably, by gas shocks or other strut-members. Top access doors of the container are generally larger than side access doors, allowing loading and unloading of larger cargo items. Access door handles on the cargo container are recessed into the surface of the side and top access doors, and include key or combination locks.

The user configures the interior space of the cargo container to arrange removable drawers and cargo space separators, held in place by frames built within the container's interior. For example, the user can carry power tools in a separate compartment from fuel cans, or business paperwork in a separate drawer from hand tools or hardware. The user can optimize the container's cargo space by removing its drawers and separators altogether, in order to carry long or bulky items.

The cargo container can be constructed as aerodynamic and curved in design and appearance, or it can be constructed as square or box-like, depending upon the cargo carrying requirements of the user. The cargo container can include tote handles on its front end, rear end and/or side walls. Tote handles are generally recessed, designed as a one-piece mold, or they can pivot outward from the body of the container, utilizing a built-in hinge. Tote handles facilitate maneuvering of the container when it is dismounted from the load carrier body.

Another preferred modular component is a cargo post, designed to secure a variety of cargo items, rather than being cargo-item-specific in nature, as are many current, conventional cargo rack systems. Each cargo post comprises a base plate for securement to the load carrier body floor panel, and one or two upright parallel towers. The towers are generally fin-shaped, accepting cargo items within the space created between two towers, or, alternatively for some cargo, accepting cargo bolted or strapped to a single upright tower. Items that are particularly conducive to being mounted in cargo posts include a bicycle's front or rear wheel (with the bicycle frame still attached) or skis, snowboards, lumber, ladders or plumbing pipes. The bottom side of the cargo post base plate may include rigid tabs, or threaded passages drilled to accept separate pins, bolts, knobs, locks, or a combination of these devices. The cargo post base plate preferably is mounted on the top surface of the load carrier floor panel, then secured or locked underneath the floor panel using a pin, bolt, knob, padlock or combination of locking mechanisms and fasteners. Once a cargo post is mounted in place on the load carrier body, the user secures or locks various cargo items to the towers and/or the load carrier body directly, using cinching and locking straps or other attachment devices.

Figure 18:
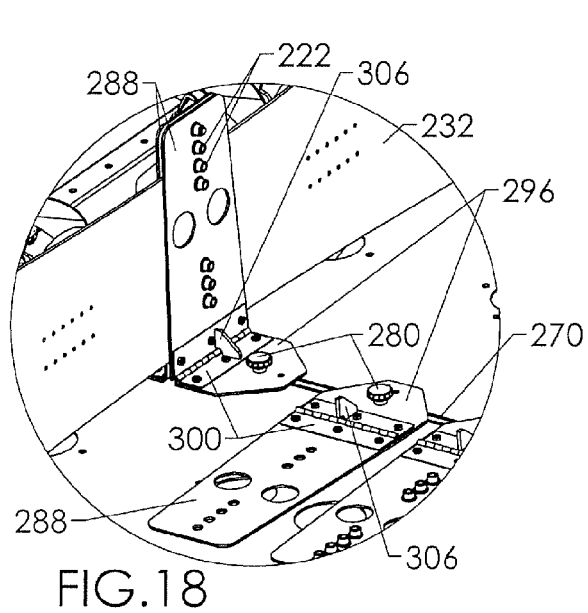
FIG. 18 is a close-up, detail view of a portion (circled in FIG. 17) of the embodiment of FIG. 17, wherein said portion comprises upending towers supporting the snowboard and towers pivoted downward against the floor panel.
Figure 30:
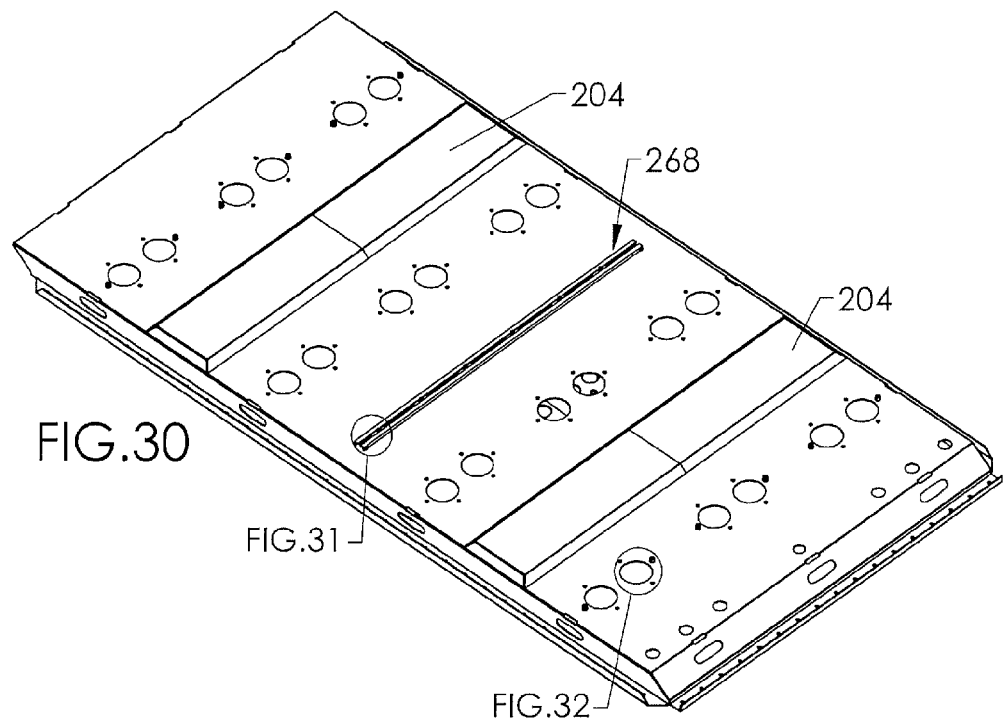
FIG. 30 is a bottom perspective view of the load carrier body of the embodiment of FIGS. 22 and 27, with the floor mounted track assembly brackets and nutserts mounted to the floor panel underside.

Multiple cargo posts can be aligned if necessary to secure longer items within the load carrier body, such as lumber, plumbing pipes or ladders. Cargo items may be held in place between the cargo post upright towers, whether two "facing" cargo towers are attached to each other or separate but movable near to each other. In other words, the opposing towers may be two portions of a single unit that fixed in relation to one another or that are adjustable in proximity to one another. Or, the opposing towers may be separate units that are moveable toward or away from each other as needed. One or more of these options will serve well to allow the user to secure almost any-size cargo item firmly between the towers. Either of these types of cargo posts and towers, and especially the type wherein opposing towers are separate but moveable, may be movable in a track system provided in the load carrier body. For example, FIGS. 14-39 show an embodiment with cargo posts that comprise a single tower per cargo post slide across the floor panel of the load carrier body by means of a track system. The embodiment of FIGS. 14-39 also includes cargo posts wherein the tower 287 is rigidly connected to its respective base plate 297 (as in right-most cargo posts in FIG. 20, and as in FIG. 26). The embodiment of FIGS. 14-39 also includes cargo posts wherein the tower 288 is pivotal relative to its base plate 296 to a flattened storage position (as in FIGS. 15, 18, left two and center two cargo posts of FIGS. 20, 23, and 24). FIGS. 14-39 also illustrate depending hook assemblies that allow suspension of cargo from edges of the load carrier.

The load carrying system has a number of advantages over prior vehicle cargo load carrying systems. With conventional mounts, a cargo-specific bicycle mount directly attached to a vehicle's load bars limits the user to carrying only a bicycle in that particular mount. And, the removal of one of a bicycle's wheels is often required to use conventional load bar bicycle mounts. To carry skis, a separate conventional ski mount typically needs to be mounted to the vehicle's load bars. For a user to carry other cargo items on their load bars, such as snowboards, or a kayak, the purchase of separate, cargo-specific components, requiring additional cost, is common.

When these conventional mounts are not in use, but left in place on the vehicle load bars, the cargo-carrying capacity of the vehicle is limited to securing alternate cargo items to the available space remaining along its load bars, again leaving the vehicle's rooftop exposed and susceptible to potential damage from cargo items during loading, unloading and transport.

Mounting a conventional cargo container directly to a vehicle's load bars often prevents the user from simultaneously carrying bulky or awkward cargo that does not fit within its mounted cargo container, such as large luggage bags, watercraft, or bulky items such as furniture or spare vehicle tires.

When using a conventional basket-style rack, cargo must be additionally secured with conventional devices such as bags, cargo nets, tarps, straps or rope. Attaching a cargo-specific mount directly to a basket style rack can limit the cargo carrying capacity within the basket. In the case of some conventional ski mounts for basket style racks, the rooftop mounted skis can prevent the user from carrying additional items within the basket, namely items that are taller than the sides of the basket.

In the case of some conventional basket rack bicycle mounts, the removal of one of the bicycle's wheels is often required.

The preferred embodiments of the invented load carrying system address many or all of the above-mentioned shortcomings. The inter-fitting design of the components within the load carrier body enables the user to optimize available rooftop cargo space, transporting a combination of cargo items of different types and sizes within a versatile rooftop cargo carrying system.

There are a number of available products well suited for use in conjunction with the preferred embodiments. All-in-one cinching and locking cables/straps can help prevent unintentional detachment of cargo items secured to the load carrier, when compared with conventional tie-down devices. Using adjustable tension, the user cinches and locks these cables or straps—and the cargo items—securely into place anywhere on the load carrier body.

Another available product well-suited to the present invention is a removable tire step, which can be suspended over a vehicle's tires, creating a raised platform for easier loading and unloading of cargo to and from the load carrier body, cargo container, and cargo posts.

Now referring specifically to the drawings:

FIG. 1A shows the preferred embodiment of one embodiment of the invention, load carrier body 10. It may be comprised of a number of materials and a combination of materials, including metals such as aluminum or steel, and high impact plastics, depending upon the size, shapes and weight of cargo items being transported.

Load carrier body 10 can be a single unit, as a product of plastic injection molding, or it can comprise panels or pieces welded together, as a product of metal fabrication. Load carrier body 10 includes a generally solid and continuous planar floor panel 12, adjoining backwardly sloping front end wall 16, which is angled toward the center of load carrier body 10 at approximately 20-60, and more preferably 30-50 degrees. Also adjoining floor panel 12 is sloping rear end wall 18, which is angled away from the center of load carrier body 10 at approximately 120-160, and more preferably 130-150 degrees.

At the top of front end wall 16 and rear end wall 18 is a lip or flange structure, called hereafter "end wall top rail 24". Each top rail 24 is a rigid beam, with one being affixed preferably to the top edge of front end wall 16 and one affixed preferably to rear end wall 18, along the entire length of wall 16 and wall 18. Each top rail 24 is preferably parallel to the plane of the floor panel 12, and forms a flat, top surface on front end wall 16 and rear end wall 18. Top rail 24 may include top rail passages 34, which are passages drilled to facilitate attachment of tie-down devices, including bungee straps and hooks.

Also adjoining floor panel 12 are left side wall 20 and right side wall 22, which upend from load carrier body 10 and may include side wall top rail 26 in their design. Each of the top rails 26 is a lip/flange that extends from the top edge of its respective side wall, at or approximately perpendicularly to the plane of its respective generally vertical side wall. Thus, the flat top surface of side top rail 26 may be created by bending the edge of either side wall at a right angle, away from the interior of load carrier body 10, creating a flat top rail surface between ½ to 4 inches wide. The edge of this top rail surface is preferably again bent at a right angle, thus creating a downwardly-depending narrow lip portion to facilitate the attachment of tie-down hooks, clasps, or other tie-down devices.

Top rails 26 may include top rail passages 34, located at various locations along the length of top rail 26. Top rail passages 34 are approximately ⅛ to ¾ inches in diameter, drilled through top rail surface 26 to facilitate attachment of tie-down devices such as bungee straps and hooks.

Top rail 26 may be fitted with an edge or rail trim of rubber or plastic molding reinforced with a pliable metal infrastructure. The rail trim grips and covers the overhanging edge of top rail 26, creating a buffer/cushion between the top rail surface and cargo items that come into contact with it, especially when a user is lifting or sliding said cargo items onto the load carrier.

Cut throughout load carrier floor panel 12 are floor panel large passages 28, which are approximately 1-4 inches in diameter. Floor panel small passages 30 are placed within ½ inch to 3 inches of floor panel large passage 28, orbiting large passages 28, as seen to best advantage in FIGS. 1A and 3. Floor panel small passages 30 are approximately ⅛ inch to 1 inch in diameter. Both floor panel large passages 28 and small passages 30 serve as tie-down attachment points along floor panel 12. Attachment tie-down devices including ropes or straps, or cinching and locking steel cables 86, and cinching and locking steel straps 124, may be threaded and routed between floor panel large passages 28. The small passages will often be used for the hooks of bungee cords, or smaller cables or fasteners. Bungee cords will typically utilize both floor panel large passage 28 and floor panel small passage 30 simultaneously, as the cords will be passed through the large passages 28 and around cargo, and their attached hooks will be inserted through the small passages 30.

The positioning of floor panel large passages 28 in pairs forms a "bridge" between large passages 28. These bridges 38 serve as large passage anchor points, which are secure anchoring locations for various attachment tie-down devices including straps, cables and rope.

Load carrier front end wall 16 is sloping, backwardly angled toward the center of load carrier body 10 at an angle of about 30-50 degrees. Load carrier rear end wall 18 is sloping, backwardly angled away from the center of load carrier body 10 at an angle of approximately 130-150 degrees. Both front end wall 16 and rear end wall 18 are approximately the same height, about 2-12 inches. The supplementary angles of front end wall 16 and rear end wall 18 serve to deflect the wind, while sloping rear end wall 18 helps facilitate loading and unloading of cargo to and from the rear end of load carrier body 10. The sloping angles of the front and rear end walls also facilitate securing cargo components, including cargo container 52, into position on load carrier body 10.

In alternative embodiments, rear end wall 18 may be constructed as upright. Rear end wall 18 can also include a hinge, or bolt and pin mechanism, along its bottom edge to allow said end wall to swing down, or be removed completely from load carrier body 10, allowing loading and unloading of cargo items directly onto floor panel 12.

Left side wall 20 and right side wall 22 are positioned upright, and are approximately 2-12 inches in height.

A series of mounting brace assemblies, including mounting brace top plate 40 and mounting brace base plate 42, is used to attach load carrier body 10 to vehicle load bar 48. (See FIG. 2.) Load bar foot 50 is an upright post that is attached to, and supports, load bar 48 on both ends of each load bar 48. A minimum of (2) load bars 48 is required for proper attachment of load carrier body 10 to a vehicle rooftop.

FIG. 1B shows an example of a rail pad 130 being attached to the load carrier front end wall 16 by rail pad attachment straps 132. The rail pad assembly (a watercraft pad version shown) facilitates attachment and transport of longer items placed on load carrier body 10, including surfboards, kayaks, and canoes. Various shapes and contours of rail pads may be provided for one or more of the load carrier body walls, ideally to guide the cargo during loading and unloading and cradle and cushion the cargo during transit. Rail pad 130 and straps 132 are generally comprised of foam and nylon, serving as a buffer between load carrier body 10 and various cargo items that the user wishes to protect from scratching or other damage resulting from prolonged contact with hard surfaces. Rail pad straps 132 may incorporate plastic or metal buckles, snaps, Velcro™ or other fasteners in their construction.

To secure rail pad 130 to load carrier body 10, the user positions the concave interior portion of the pad over the load carrier end wall top rail 24 or side wall top rail 26, then routes or loops one buckled end—the 'male' or 'female' end—of rail pad strap 132, through load carrier wall small passage 36. The end of strap 132 is then fastened to its complimentary 'male' or 'female' buckled end of rail pad strap 132. The user then cinches said strap, and pad, tightly to the load carrier wall, thus securing rail pad 130 to load carrier body 10.

Figure 12:
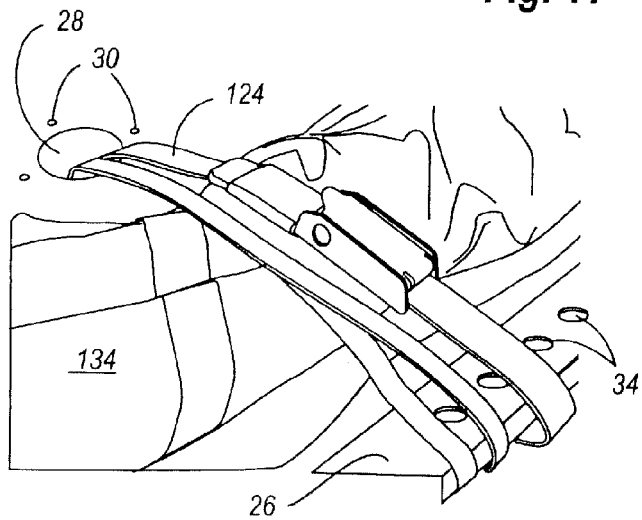
FIG. 12 is a top view of a cinching, locking strap securing a duffel/ski bag to the load carrier body, wherein the strap extends around a side wall lip/flange and through an aperture/passage in the floor panel of the carrier body.

Large passages 32 provided in the upending walls of the carrier body may also be utilized in the fastening of rail pad 130 to load carrier 10. Once rail pad 130 is secured to load carrier body 10, an additional attachment device, such as cinching steel cable locking strap 124, can be used to lock cargo items directly to load carrier body 10, as shown in FIG. 12. Cinching and locking strap 124 may also be incorporated into the design of rail pad strap 132, to facilitate securing and locking of cargo items to load carrier body 10 without requiring an additional attachment or tie-down device.

FIG. 2 shows a close-up perspective of load carrier body 10 attached to a vehicle load bar 48, utilizing a mounting brace assembly. Mounting brace bolt 46 is first routed through mounting brace top plate 40, through the top side of floor panel 12, passing underneath floor panel 12 and around load bar 48, passing through mounting brace base plate 42, and finally secured with mounting brace fastener 44. Mounting brace bolt 46 can also be routed upward from underneath floor panel 12, passing through mounting brace base plate 42, around load bar 48, through floor panel 12, through mounting brace top plate 40, and finally secured atop floor panel 12 with mounting brace fastener 44. Fastener 44 may be a nut, wing nut, butterfly nut or other fastener.

In the preferred embodiment, mounting brace top plate 40 (FIG. 1A) is generally flat and recessed into floor panel 12. Mounting brace top plate 40 and mounting brace base plate 42 secure vehicle load bar 48 between them. Mounting brace base plate 42 is generally curved to contour the shape of load bar 48, as shown in FIG. 2. In alternative embodiments, a locking mechanism can be incorporated into the mounting brace assembly, locking load carrier body 10 to load bar 48.

FIG. 3 shows a close-up of load carrier left side wall 20, and the underside of load carrier floor panel 12. The large passages 32 are cut into load carrier body side walls and end walls. The preferred embodiment of these large passages 32 is oval or round in shape, to reduce pinching and friction exerted upon cargo tie-down devices, such as nylon straps or rope. Large passages 32 are approximately 2-6 inches in length and ½ to 3 inches in width.

Small passages 36 are also provided in the load carrier body walls, as shown in FIGS. 1A, 1B and 3, and are generally oval or round in design. Small passages 36 may accept the rail pad attachment straps 132 discussed earlier, as shown in FIG. 1B. The small passages 36 are preferably at or very near the plane of the floor panel, and therefore serve well as drainage sites for rainwater atop load carrier body 10.

As illustrated in FIG. 3, one or more floor panel hat channel 14 is/are preferably affixed to the underside of floor panel 12, but hat channels 14 may alternatively or additionally be affixed to the upper surface of floor panel 12. Hat channels 14 are bracing beams that extend the length and/or width of floor panel 12. Each hat channel 14 extends approximately ⅓ to 3 inches from the surface to which it is affixed, and about 2 to 8 inches wide. Hat channel 14 includes slanted edge walls where it adjoins floor panel 12.

Affixing a hat channel 14 comprised of metal to a metal floor panel 12 is done by welding or fastening with bolts, rivets or other hardware. The affixing of a high impact plastic hat channel 14 to a high impact plastic floor panel 12 is accomplished during the plastic injection molding process, when fabricating load carrier body 10 as one solid unit. Hat channel 14 can also be glued or affixed to load carrier body 10 when floor panel 12 is made of plastic, using bolts, rivets or other hardware.

Attaching one or more hat channels 14 to the top or underside of load carrier floor panel 12 increases the rigidity of floor panel 12, enabling heavier loading of cargo items within load carrier body 10, thus reducing bowing of floor panel 12, compared with a load carrier floor panel 12 that does not incorporate hat channels 14.

Figure 4:
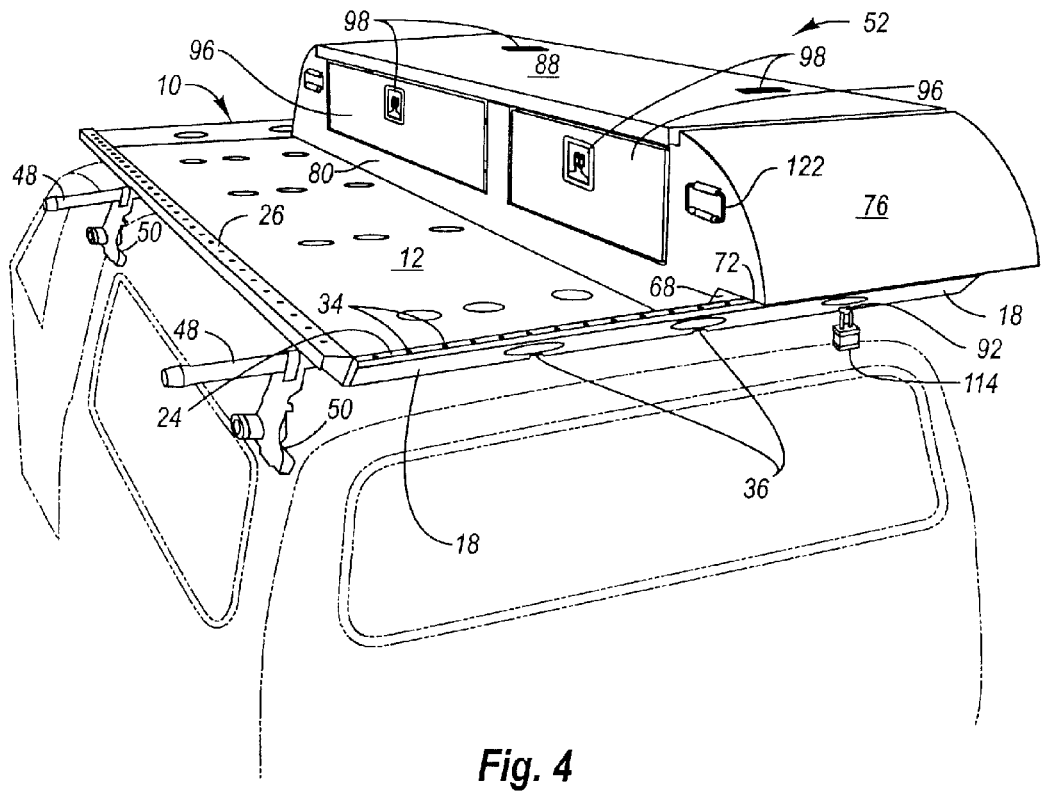
FIG. 4 is a rear perspective view of the load carrier body of FIGS. 1-3, and one embodiment of a cargo container mounted thereon.

FIG. 4 shows a rear perspective of load carrier body 10, attached to load bars 48, with cargo container 52 secured to/within load carrier body 10. To secure container 52 to load carrier body 10, the user slides container 52 along floor panel 12 in the center, left or right side of load carrier body 10. Sliding container 52 along floor panel 12 is facilitated with slide tabs 106, shown in FIG. 5. Slide tabs 106 are comprised of strips, squares or pieces of high impact plastic material, and are mounted to the exterior of container front lower panel 60 (or "nose panel" 60) with adhesives, rivets or other fastening device. Slide tabs 106 are generally ½ to several inches wide, and attach along the bend/corner where cargo container front panel 60 adjoins cargo container floor panel 56. Slide tabs 106 can also be mounted to the exterior of cargo container rear lower panel 68 and riveted, bolted, or adhered along the bend formed where container rear lower panel 60 adjoins cargo container floor panel 56.

Container nose 60 fits snugly under sloping load carrier front end wall 16. This "interfitting" design prevents cargo container 52 from moving forward when positioned in load carrier body 10. Rear lower panel 68 of cargo container 52 incorporates the same angle as rear end wall 18 of load carrier body 10. This allows cargo container rear lower panel 68 to abut load carrier rear end wall 18. This "interfitting" design inhibits container 52 from moving in reverse when positioned in load carrier body 10.

To secure and lock cargo container 52 to load carrier body 10, a rear tab 92 depending from the rear lower panel 68 is utilized. Tab 92 is permanently mounted and centered on rear lower panel 68. Tab 92 is generally about ¼ inch to several inches in diameter, and may be semi-spherical, rounded, knob-like, bulb-shaped, or other shapes. The tab preferably is sized and shaped to extend through the small passages 36. The tab preferably depends a distance that allows a lock to urge the cargo carrier downward against the load carrier rear end wall, or that at least does not allow a lot of leeway for the cargo carrier to "jump" very far off of the load carrier body. In the preferred embodiment best illustrates in FIG. 7, tab 92 is a rounded shape, with tab passage 94 formed through the midsection of tab 92. Passage 94 is generally ⅛ inch to ¾ inch in diameter to allow for a variety of padlocks, pins, or other locking mechanisms.

When cargo container 52 is set into place in load carrier body 10, tab 92 protrudes through chosen load carrier wall small passage 36, located along load carrier rear wall 18. Small passages 36 along the lower edge of load carrier rear wall 18 may be widened or otherwise modified to specifically to accept tab 92. (See FIG. 6.) Once set in place through rear wall 18 at small passage 36, tab 92 is fitted with a pin or padlock 114, which is routed through tab passage 94. Once locked in place, padlock 114 (or similar pin mechanism) prevents tab 92 from withdrawing from wall small passage 36. In turn, cargo container 52 is prevented from withdrawing from load carrier body 10. The inter-fitting relationship of tab 92, rear end wall 18, wall small passage 36 and padlock 114 prevents cargo container 52 from sliding vertically or laterally along floor panel 12 and rear panel 18. The result is a secure, interlocking fit of container 52 within load carrier body 10, using one locking mechanism. Alternative embodiments of a locking mechanism can be constructed and mounted directly to load carrier 10, to facilitate locking of cargo container 52 to load carrier body 10.

As mentioned in the paragraph above, modifications to small passages 36 may be made to enhance cooperation between small passage 36 and tab 92. Tab, and cooperating passages, may be round, oval, cross, x-shape, or crescent shape, for example. This modification may be accomplished by cutting a larger or differently-shaped perimeter to form passage 36.

Figure 5:
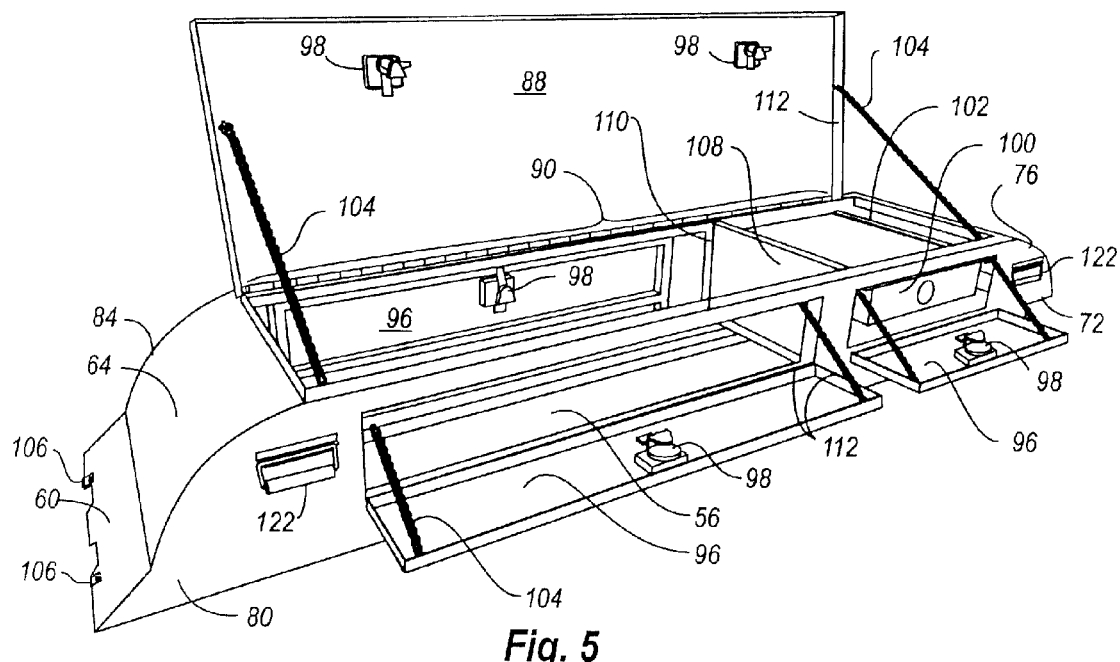
FIG. 5 is a left side perspective view of the cargo container of FIG. 4, with access doors open.

FIG. 5 shows the preferred embodiment of cargo container 52. Container floor panel 56 can be flat, or it can incorporate a reinforcing channel and ridge design to increase rigidity in container floor panel 56. One or more channels/ridges may extend the length of floor panel 56, continuing upward, into adjoining front lower panel 60 and rear lower panel 68.

The cargo container's front lower panel 60 and rear lower panel 68 also incorporate said channel design in their construction, allowing the flow of liquid, such as rainwater, beneath container 52 and out of load carrier floor panel passages 28, 30, and wall small passages 36.

The container's front end panel upper panel 64, and rear upper panel 76, may curve or slope at an angle to horizontal, as shown to best advantage in FIGS. 4 and 5. This curvature makes the container more aerodynamic.

Cargo container 52 includes a left side wall 80 and a right side wall 84 that are positioned upright, and are joined to the container's front lower and rear lower panels. Left side wall 80 and right side wall 84 can be continuous and solid, or they can incorporate one or more framed openings in their design to accommodate one or more side access doors 96. As may be seen in FIG. 5, side access doors 96 are preferably provided on both right and left sides of the container, for access from either the right or left of the vehicle.

One or more cargo container top access doors 88 may form the top wall of the container, and/or be provided in a top wall of the container. In the preferred embodiment, one top door 88 forms all, or substantially all, of the top wall of the container, and, thus, is provided at or near the top of the container's two side walls.

Side access doors 96 and top access door 88 may be pivotally connected to the container, using a door hinge 90 along one edge of each door. Side and top access doors may include door suspension chains 104 or gas shocks or other struts, affixed to their interiors, to support or suspend the access doors when in the open position, as shown in FIG. 5. Side and top access doors include one or more locking handles 98, which are recessed into their respective access doors.

Another preferred feature of container 52 is drawer 100. There can be one or more drawers 100, which slide along drawer frame 102. Drawer 100 can be accessed from either side of container 52 when right and/or left side access doors 96 are open. Drawer 100 can be removed to optimize bulk cargo space inside container 52.

Another feature container 52 is space separator 108, held in place within space separator frame 110. Space separator 108 can be removed to optimize bulk cargo space inside container 52.

Side access doors 96 and top access door(s) 88 can include edge and rail trim 112, which may be an overhanging, depending lip and/or may comprise a rubber/polymeric sealing material, along interior edges to impede water from entering container 52.

Cargo container 52 includes tote handles 122 to facilitate lifting and carrying of the container, as well as facilitate the mounting and dismounting of container 52, from load carrier body 10. Tote handles 122 can include spring mechanisms to allow said handles to pivot or slide outward when in use and return to a position flush with the container's side walls or end panels when not in use. Tote handles 122 may also comprise recessed handholds incorporated into the side panels and end panels of container 52, which recessed wells or handholds would typically remove the need for pivoting, spring assisted.

Figure 6:
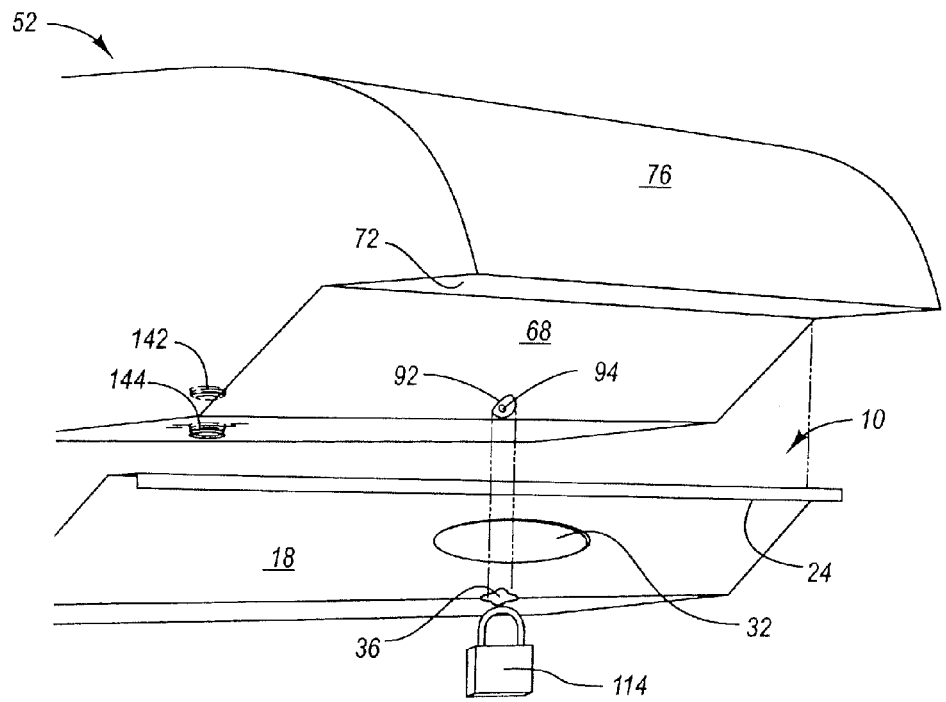
FIG. 6 is a close-up, rear perspective view of cargo container lower rear end panel with a tab (here a mound-shaped protrusion), and the cooperating load carrier body rear end wall, wherein the tab extends through a passage in the load carrier body rear end wall to be locked by a padlock underneath said carrier body rear end wall.

FIG. 6 shows a close-up rear perspective of the mechanical relationship between the rear portions of cargo container 52 and load carrier body 10. More specifically, FIG. 6 shows the inter-fitting and locking relationship of cargo container rear lower tab 92, permanently mounted on container rear lower panel 68, designed to fit into load carrier wall small passage 36, and be secured by padlock 114. One will note that the plane of the rear end wall 18 matches (is parallel to) the plane of rear lower panel 68, that is, wall 18 and panel 68 are at the same or nearly the same angle relative to the floor panel 12, and container floor panel 56, respectively. Also, one will note that the plane of top rail 24 matches (is parallel to) the plane of panel portion 72, that is, the angle of the bend/weld that connect panel 68 to panel portion 72 is the same or close to the same as the angle of the bend/weld that connects wall 18 to rail 24.

Figure 11:
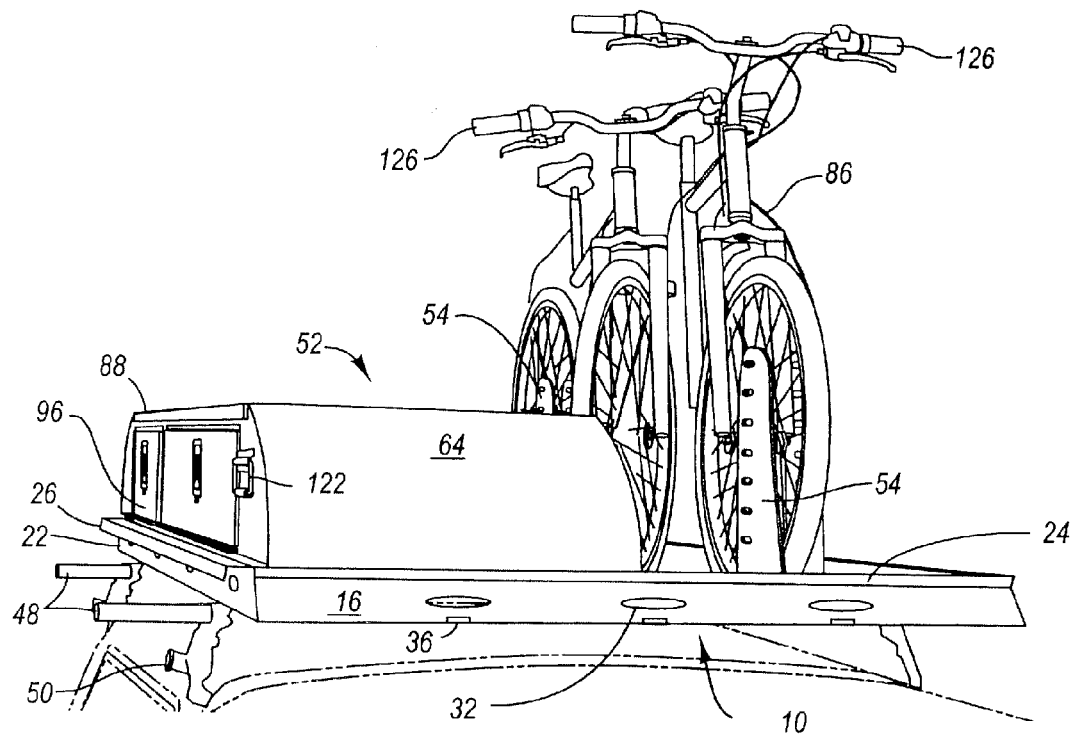
FIG. 11 is a front perspective view of the load carrier body, the cargo container, and two two-tower cargo posts securing two bicycles to the load carrier body.

Cargo container front lower panel 60, also called the cargo container nose, fits securely under load carrier front end wall 16, as shown in FIG. 11, while cargo container rear lower panel 68 simultaneously abuts load carrier rear end wall 18, as shown in FIG. 6. This inter-fitting relationship of load carrier body 10 and cargo container 52 accomplishes a secure fit of container 52 within load carrier body 10, minimizing shifting of the container, vibration and noise associated with vehicle movement and wind friction.

Cargo container drainage plug receiver 144 is a threaded port mounted in cargo container floor panel 56, at the rear of container 52, as shown in FIG. 6. Drainage plug 142 is a push-in or screw-in stopper or insert, comprised of rubber and metal. Plug 142 is designed to fit into drainage plug receiver 144, preventing liquid from entering the container from the container's underside. Plug 142 can be removed by the user when draining liquid, including water, mud or other debris, from within cargo container 52.

Figure 7:
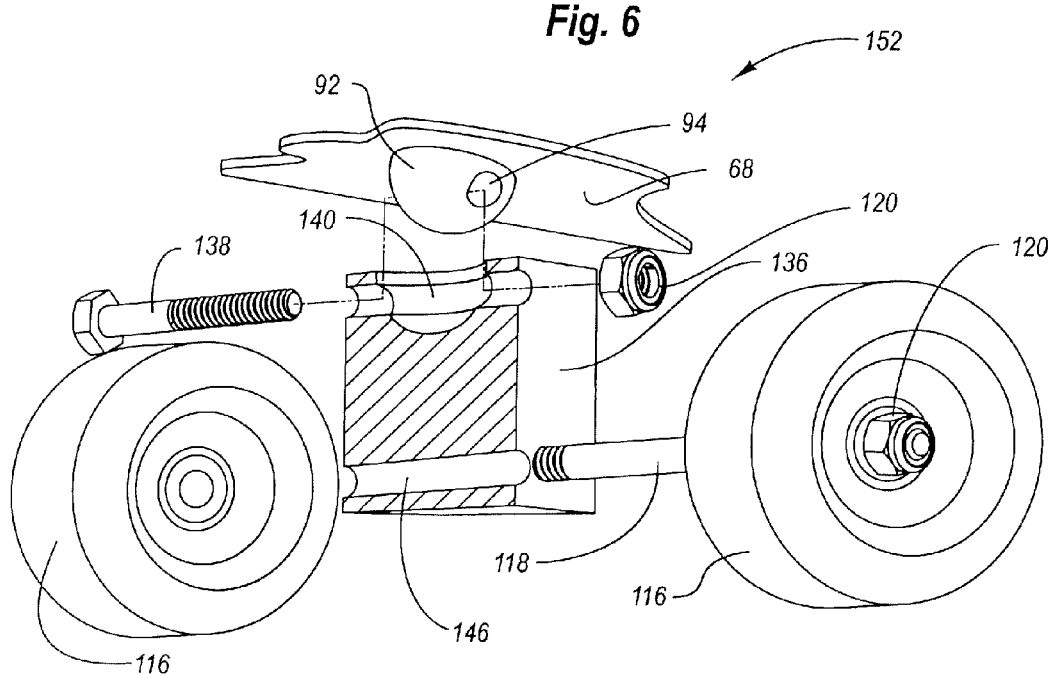
FIG. 7 is a close-up, rear perspective view illustrating a cargo container removable tote wheel assembly being connected to the cargo container rear lower panel tab after the cargo container is removed or distanced from the load carrier body.

FIG. 7 shows a close-up perspective of the mechanical relationship between cargo container rear lower panel tab 92, permanently mounted to the exterior of cargo container rear lower panel 68, and one embodiment of a cargo container tote wheel assembly 152. Once secured to tab 92, removable tote wheel assembly 152 enables the user to more easily maneuver and transport container 52 on the ground, when the container is dismounted from load carrier 10.

Tote wheel assembly 152 attaches to cargo container tab 92 by the following procedure: The top surface of tote wheel block 136 includes upper passage 140, incorporating a concave, molded shape complimentary to tab 92, allowing tab 92 to fit within upper passage 140. The top surface of tote wheel block 136 in turn fits flush against the flat surface of cargo container rear lower panel 68. Once the tab is received in wheel block passage 140, the user installs tote wheel tab bolt 138 through upper passage 140 and tab passage 94. A secured fastener 120, such as a nut, wing nut or other fastener, is installed on the exposed, protruding end of tab bolt 138 to retain bolt 138 in place.

One or more tote wheels 116 are rotatably connected to tote wheel block 136. One tote wheel 116 is secured to one end of suspension rod 118 by a fastener 120. The opposing end of suspension rod 118 is inserted through tote wheel block 136 at tote wheel block lower passage 146. Suspension rod 118 protrudes to the exterior of tote wheel block 136, where an additional tote wheel 116 is attached to suspension rod 118 with a fastener 120. Alternative attachment systems may be used to rotatably connect the tote wheels to the cargo container. For example, tote wheels may be mounted independently onto the container. For example, with each wheel and its axle/push-pin may be housed in an independent housing portion or space, wherein said independent housing portions/spaces are preferably at opposite (right and left) sides of the container. Other wheel axle and mounting systems may be used, and the tote wheels may be removable and replaceable.

Once secured to container 52, tote wheel assembly 152 enables the user to maneuver and transport container 52 in a manner similar to maneuvering a wheelbarrow, without an assistant. The user lifts the container's front end, holding onto cargo container tote handles 122. As the user pushes or pulls container 52 over smooth and semi-smooth ground surfaces, the tote wheel assembly 152 acts as a fulcrum, supporting the container's rear end, bearing the load of container 52, facilitating easier movement of the container 52 when compared with a container without a tote wheel assembly 152.

FIG. 8 shows a top perspective of load carrier body 10, utilizing one embodiment of a cargo post 54. When comprised of metal, cargo post 54 comprises several plates welded together to form one unit. When comprised of plastic, cargo post 54 can be injection molded to form one unit. As will be discussed later in this document, alternative cargo posts may be provided that comprise multiple towers that are adjustable in position relative to each other. Or, other alternative cargo posts may each comprise only one tower, but the cargo posts are adjustable in position relative to each other to move two "facing" cargo towers near each other for receiving cargo between the individual towers. Specifically, it is desirable that the cargo not pivot/rotate around an axis parallel to the longitudinal axes of the towers, and the large, flat inner surfaces of the towers prevent such pivoting/rotations. This way, an elongated cargo item may be secured between the towers in an orientation parallel to the length of the load carrier and the vehicle, and not pivot or rotate out of that parallel orientation.

The cargo post towers are preferably plate structures that are longer than they are wide, and much longer and wider than they are thick. The preferred towers have substantial (at least 3 inches) of surface area on their inner surfaces (facing a cooperating tower), so this substantial flat surface area contacts and/or otherwise retains cargo without gouging the cargo and without allowing the cargo to rotate/pivot in the cargo posts.

Cargo post 54 includes base plate 58, which supports two upright towers juxtaposed to one another in parallel, symmetrical formation. Cargo post left side tower 148 and cargo post right side tower 150 rise from base plate, with a space provided between the two towers, for accepting cargo items in said space. The cargo may be varying widths, heights and lengths, as long as the width fits in said space. Examples of cargo are a bicycle wheel still mounted on a bicycle 126, or skis, ski poles, snowboards, lumber, ladders, plumbing pipes, and various cargo items.

In the preferred embodiment, cargo post 54 includes side small passages 74, middle small passages 78, and long passages 82, located along left side tower 148 and right side tower 150. See FIG. 8. These passages are of various lengths, approximately ⅛ to ½ inches in diameter. These passages serve as attachment sites for bungee hooks, straps, ropes, or other attachment devices, such as cinching locking cable 86.

In the preferred embodiment, bicycle 126 is secured and locked to cargo post 54 utilizing cinching cable lock 86. See FIG. 8. To accomplish this, one end of cable lock 86 is threaded into cargo post middle small passage 78, then threaded through the front or rear wheel of bicycle 126, then routed through the bicycle's suspension forks and/or around its frame. The cable end is finally threaded into the receiving head of cable lock 86, where the excess cable is then cinched tightly and locked into place with a key or combination mechanism. This procedure secures and locks bicycle 126 to cargo post 54, inhibiting movement or detachment of bicycle 126 from within load carrier body 10.

In alternative embodiments of cargo post 54, left side tower and right side tower can be positioned at various distances from one another to 'squeeze' cargo items of varied widths between the opposing towers. In these embodiments, a track system or slots, in which the towers may slide and preferably be locked, is provided in/on the base plate of the cargo post. The track/slot system allows for sliding and securing of one or both towers closer to, or farther from one another, similar to that of a vise, to allow secure positioning of cargo items of various widths between the opposing towers. One of skill in the art will recognize how such a track or slot system may be made, after viewing and reading this disclosure and the drawings.

FIG. 9 shows a close-up perspective of cargo post 54 mounted to floor panel 12 of load carrier body 10. Cargo post base plate 58 is aligned over the paired floor panel large passages 28 and floor panel small passages 30. Once in position, cargo post 54 is centered over any large passage anchor point 38 and fastener 62, 66 is installed through a chosen small passage 30. The fastener may comprises a threaded bolt incorporated into mounting knob top 62, and which is routed through the mounting passage 70 of the base plate 58. The threaded bolt of mounting knob top 62 protrudes through and underneath floor panel 12, where the bolt is threadably connected to knob bottom 66. Mounting knob top 62 and mounting knob bottom 66 are tightened, thus, attaching base plate 58, and in turn cargo post 54, to floor panel 12 of load carrier body 10. Alternative fastener embodiments may be used, including those that include a locking mechanisms to lock, as well as connect, cargo post 54 to floor panel 12.

FIG. 10 shows a front and top perspective of load carrier body 10 carrying (4) cargo posts 54 and (4) bicycles 126. One cargo post 54 secures one bicycle 126 at either the front or rear wheel of bicycle 126. Due to the security and stability of the cargo posts, it is not typically not necessary to support both the front and rear wheel of a given bicycle in cargo posts.

In the preferred embodiment, one cinching cable lock 86 is used to secure one or more bicycles 126 at one time. The user routes or loops one end of the cable through the wheels and frames of the bicycles as they are aligned closely within load carrier body 10. One cinching cable lock 86, or one conventional locking chain or cable, may be used to secure one or more bicycles 126 to one or more cargo posts 54, or directly to load carrier body 10 in a number of locations, utilizing the passages cut throughout load carrier body 10.

FIG. 11 shows a front and side perspective of load carrier body 10, cargo container 52, two cargo posts 54, and two bicycles 126. In this arrangement, the user can open cargo container side access doors 96 to load or unload cargo items to or from cargo container 52. In the open position, side access doors 96 would be suspended above right side wall top rail 26, creating a flat working surface or loading platform (as shown in FIG. 5.) The user can also access bicycle 126 without removing cargo container 52 or cargo post 54.

FIG. 12 shows a close up perspective of cinching, locking cable strap 124 securing duffel/ski bag 134 to load carrier body 10. One or more straps 124 can be used to lock a variety of items directly to load carrier body 10. The user routes or loops one end of strap 124 through a chosen passage on load carrier body 10, then threads the strap end through the locking mechanism built into strap 124. The user then cinches excess strap material tightly before binding it within the locking mechanism, in turn locking cargo items in place on load carrier body 10. FIG. 12 illustrates how conventional cargo items such as ladders, ski bags, and various sports equipment, such as surfboards and other watercraft, can be secured to load carrier body 10 without the use of additional, customized cargo securing components. Cinching locking strap 124, and the cinching locking cable 86 shown in FIG. 8, are two products available that are well suited for use with the load carrying system of the invention.

Figure 13:
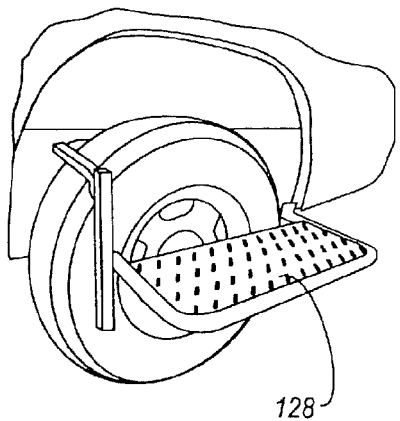
FIG. 13 is a side view of a portable tire step mounted on a vehicle tire, which may be useful in loading of the invented load carrier system.
Figure 17:
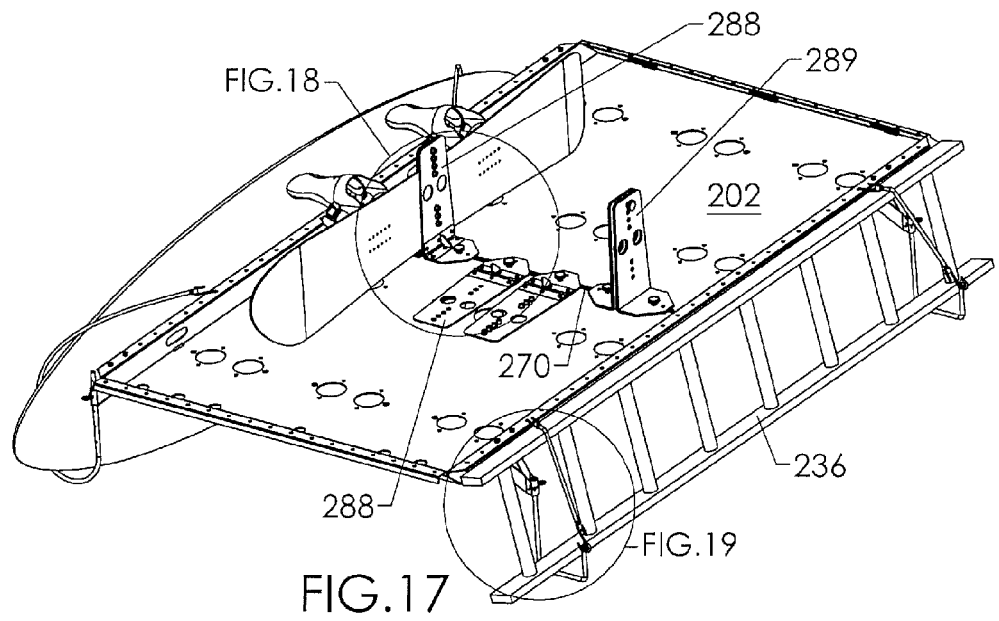
FIG. 17 is a rear perspective view of the load carrier of FIG. 14, showing additional cargo posts attached to the floor-mounted track assembly but not in use. The cargo posts at center are positioned in a downward aspect using hinges.

FIG. 13 shows a close up side perspective of tire step 128, which is another available product well suited for use with the invention. Tire step 128 folds flat when not in use. When attached to the tire of a vehicle, tire step 128 facilitates easier loading and unloading of cargo items to and from load carrier body 10, cargo container 52, and cargo post 54. Standing upon the flat platform created by tire step 128, the user can more easily access cargo items within load carrier body 10.

An especially-preferred embodiment is described in detail below.

FIGS. 14-39 portray an alternative embodiment of the invented load carrying system, which may include cargo posts that are adjustable in position in a track provided in the load carrying body (tray/platform), cargo posts with towers that are pivotal to be parallel to the top surface of the carrying body, and/or depending hook assemblies that may be used to suspend cargo from edges of the carrying body.

FIG. 14 shows an alternative embodiment of load carrier 200, having floor panel 202, front end wall 206, rear end wall 208, left side wall 210 and right side wall 212. Floor panel 202 is a generally flat and continuous surface, except that passages are provided for attachment of cargo carrying components and for drainage. The passages, however, account for less than 50 percent of the surface (and preferably less than 25 percent) of the floor panel 202, and so the panel 202 may be called a tray, plan, or platform with passages or apertures, but preferably does not have so many apertures or such large apertures that the panel 202 may be described as a screen, mesh, frame, or basket. The panel 202 may be described as a panel or tray wherein the solid structure between the apertures has substantially greater dimensions than the apertures; this way, the panel 202 may be differentiated from a screen, mesh, frame or basket wherein the bars, strips, rods, crosspieces, sticks, dowels, weave members or other rigid or generally rigid members forming said screen, mesh, frame, or basket, are transversely thinner than the diameter or width of the apertures/spaced between said rigid or generally rigid members.

Cargo items can be secured to floor panel 202 with cargo posts comprised of cargo post base plates 296, 297 that are connected to cargo post towers 288, 287 (respectively). While cargo posts are only shown connected to track assemblies in FIGS. 14-39, it will be understood from description earlier in this document and from FIG. 9 that cargo posts may be attached in regions of the floor panel other than the track assemblies. In some embodiments, cargo post base plates 296, 297 may be attached to floor panel 202 over any of the paired floor panel large passages 218, for example, passages 218 shown in FIGS. 20 and 32. Cargo post base plate 296, 297 may be mated to floor panel 202 with the use of a hand tightened bolt 280 passing from the top surface of cargo post base plate 296, through base plate bolt passage 308 (FIG. 35) and threaded into a nutsert 223 (FIG. 20) or other threaded receptacle fastened to floor panel underside of the floor panel at small passages 220 or otherwise provide on/in the floor panel.

In another example of cargo posts for supporting cargo, opposing cargo post towers 287, 288 are shown in FIGS. 14, 15, 17, 18, 20, 21 connected to a track assembly, described in detail later in this document, and supporting a snowboard 232. Snowboard 232 is secured between the cargo post towers, which are bolted together near their top edges by a hand-tightened bolt 280 through an appropriate pair (at the same level above the floor panel) of apertures 294. These apertures may all be threaded, or the apertures of only one of the cooperating towers may be threaded, in order to threadably receive the hand-tightened bolt 280 for connecting and tightening the towers together. Additional, larger apertures 292 are preferably provided in each tower, for example, for receiving cords, straps or other ties; preferably apertures 292 are not threaded.

Figure 35:
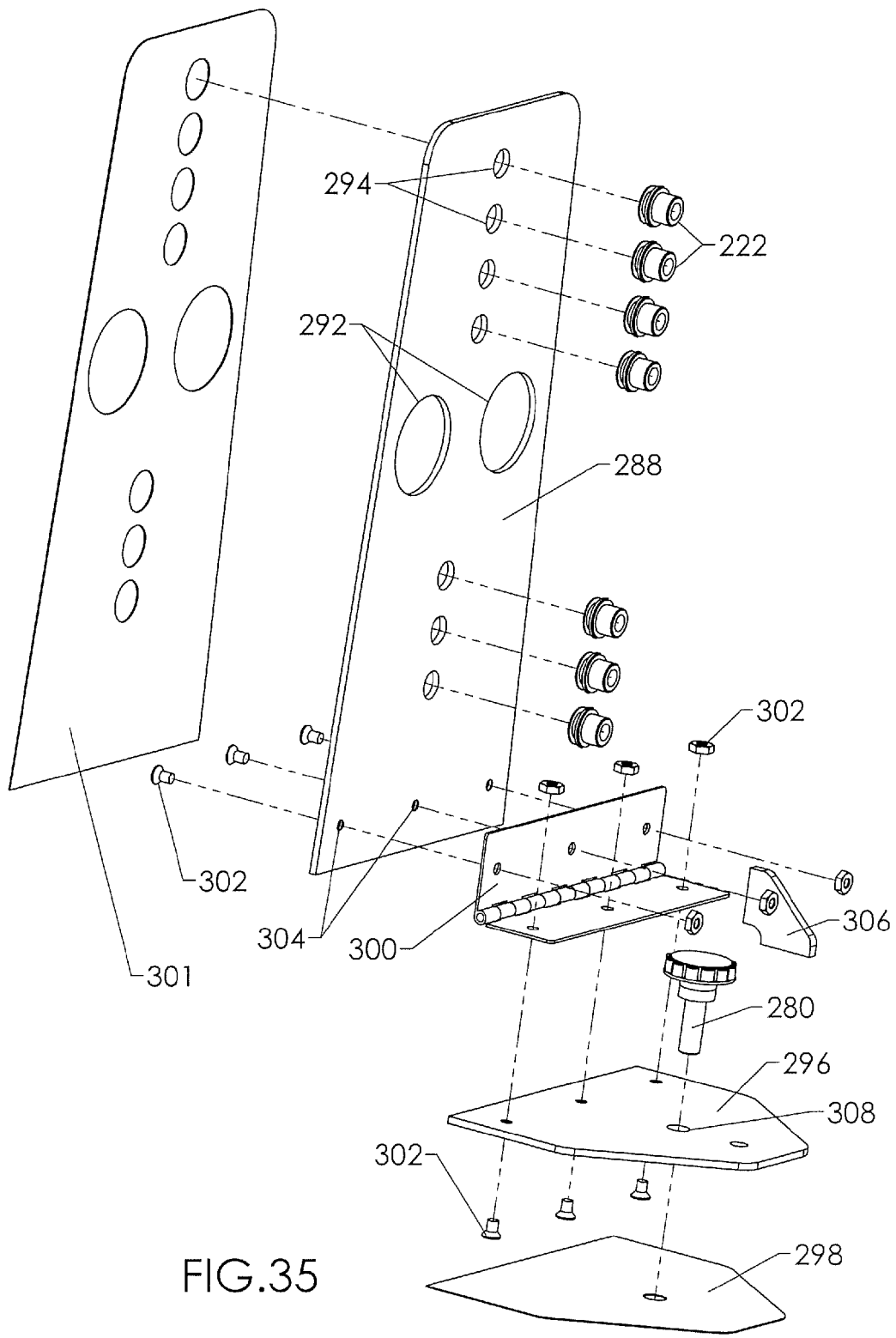
FIG. 35 is a perspective, exploded view of a pivotal cargo post assembly such as that in FIGS. 33 and 34, wherein an inner cover/pad, nutserts, hinge assembly including hardware, stop tab and hand tightened bolt, cargo post base, and base plate cover/pad are visible. In this view, the cover/pad is positioned for affixing to the face of the tower that will face a tower of another, cooperating cargo post. The cooperating cargo post tower will preferably also comprise a similarly-placed cover/pad, so that cargo received between the towers will be protected.

In the preferred pivotal cargo posts, each cargo post tower is connected to its respective cargo post base plate 296 with a cargo post tower hinge assembly 300, as shown to in FIGS. 15 and 35. The preferred positioning of skis or snowboards within cargo post towers 288 is between the foot bindings or snowboard boot bindings 234.

Cargo post base plates 296, 297 may be attached to load carrier floor panel track assembly 268, which is accessible through channel 270 in the floor panel. In FIGS. 14, 15, 17, 18, 20, 22, 23, 24, and 27, only the elongated opening in the floor panel (channel 270) is visible, but the pieces-parts of the preferred track assembly 268 are visible in the detail view of FIG. 29, the bottom view of the load carrier body of FIG. 30, and the detail view of FIG. 31 (a bottom view of the portion shown). The pieces-parts of the track assembly 268 comprise a threaded hand tightened bolt 280 and bolt carriage body 278 that receives the threaded bolt 280. From the top surface of the load carrier floor panel 202, the user threads the hand tightened bolt 280 through the bolt passage 308 in the cargo post base plate. FIGS. 26 and 29 illustrate a base plate 297 of a non-pivotal cargo post cooperating with the track assembly, but pivotal-type cargo posts may also cooperate with the track assembly, as shown in FIGS. 22-24. The bolt 280 passes through floor panel channel 270 into a threaded bore in carriage bolt body 278, which is retained in an interior elongated pocket (space) 276 between two elongated L-brackets 273, 273'.

Before tightening the bolt 280 relative to the carriage bolt body 278 of the track system, the user slides the bolt 280 plus carriage bolt body 278 along the track to a desired location. Also, before tightening the bolt in body 278, cargo post base plate 297 (or other types of base plates), may rotate because it is in loose engagement with floor panel 202 and carriage bolt body 278; this provides additional adjustment of the orientation and position of the cargo post. After the position of the cargo post along the track system is adjusted and the cargo post is rotated to face the desired direction, the user then tightens hand bolt 280 to secure the cargo post base plate 297 (or alternatively plate 296) firmly in the desired position upon load carrier floor panel 202.

One or several floor panel of the track assemblies 268 may be welded, fastened or attached, preferably to the underside of the load carrier floor panel 202. By providing the components of the track system underneath the floor panel 202, the floor panel has few or no upward protrusions that might snag cargo being slid across the floor panel 202. For each track assembly 268 is provided a channel 270 or other slot cut through floor panel 202. Channel 270 preferably measures from ⅛-1 inch across, allowing for hand tightened bolt 280 to fit through channel 270 and engage the components of the floor panel track assembly 268 that reside underneath the floor panel 202.

Figure 31:
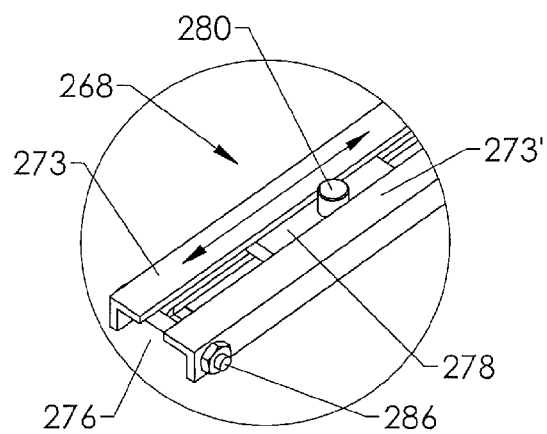
FIG. 31 is a close-up, detail view of the floor panel track assembly of FIG. 30, featuring a channel/pocket that accepts and houses one or more bolt carriage bodies that slide along the track and accept a hand-tightened bolt, as seen protruding in the drawing, that extends through a cargo post base plate on the top of the load carrier (not visible in this figure).
Figure 32:
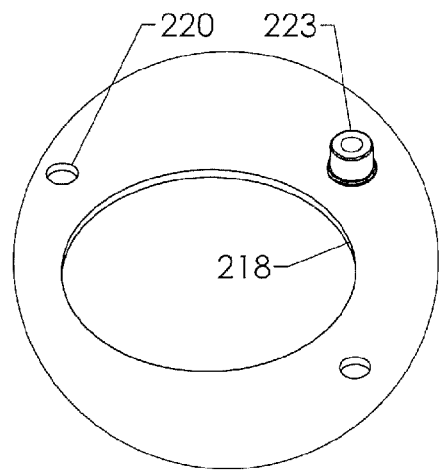
FIG. 32 is a close-up, detail view of a portion of the underside of the load carrier body of FIG. 30, showing large and small passages through the carrier body. In one of the small passages, a threaded nutsert is affixed, accepting a bolt to secure a cargo post base plate.

Bolt carriage body 278, which may be approximately the size and general shape of a playing domino, slides freely within carriage bolt pocket 276 created by opposing brackets 273, 273' welded to the underside of load carrier floor panel 202. Each of the opposing brackets 273, 273' comprises a 90-degree bend to form the L-shape. Bolt carriage pocket 276 is not completely housed, as the opposing brackets 273, 273' are spaced apart without their inner edges contacting each other. Thus, pocket 276 is open at its bottom (understandable by rotating the bottom view, of FIG. 31, 180 degrees so that the track assembly is positioned as it is during use). This open bottom of the track assembly allows the end of hand-tightened bolt 280 to thread or pass through bolt carriage body 278, as shown in FIG. 31. This open-bottomed, and preferably partially-open-ended, L-bracket 273, 273' system for track assembly 268 prevents water, snow or debris collected on floor panel 202 from clogging floor panel track assembly 268.

Bolt carriage pocket 276 comprises stops at each end of the pocket, preferably in the form of carriage stop hardware 286, such as a removable bar, shaft, or other member that extends transversely between the L-brackets 273, 273'. Removing carriage stop hardware 286 allows the user to remove or insert bolt carriage body 278 from, or into, bolt carriage pocket 276.

The distance between opposing cargo post towers (288 at the left of FIGS. 21, and 287 at the right of FIG. 21) is set depending upon the width of the cargo items being secured, because each tower is connected to its own separate base plate, rather than two towers being fixed and immovable on a common base plate. Thus, the towers shown in FIGS. 14-39 can be adjusted by sliding their respective cargo post base plates 296, 297 laterally along the floor panel track assembly 268, shown in FIG. 27. Alternatively, the track assembly or additional track assemblies, may be provided parallel to the longitudinal axis of the load carrier 200 (parallel with the length of the vehicle).

The cargo post towers have apertures 294 (see FIG. 15) along a longitudinal axis of the tower, and, in at least one tower of each cooperating pair of towers, the apertures 294 are threaded so that they threadably receive a bolt 280. In the right-most pair of cargo posts in FIGS. 20 and 21 and in the detail view of 26, for example, one of the towers 288 has threaded apertures, while the apertures of the cooperating tower 289 needs not and preferably does not have threading. One may see in FIG. 21 that a bolt extends from left to right in the left pair of cargo posts, and from right to left in the right pair of cargo posts; the tower closest to the head of the bolt need not be threaded.

Friction between the underside of cargo post base plate 296, 297 and floor panel 202 may reduced by using cargo post base plate cover/cushion 298 (FIG. 35), which may be made of UHMW plastic or other abrasion-resistant material, which material preferably has a slick/low-friction surface for contacting the floor panel 202.

As best illustrated in FIGS. 33-35, cargo post hinge assembly 300 connects cargo post tower 288 to cargo post base plate 296, using cargo post hinge attachment hardware 302 and cargo post hinge attachment passages 304.

The preferred position of each tower 288 relative to its base plate 296, when securing cargo items such as snowboard 232, is in an upright position, preferably about 90 degrees to the base plate 296. Cargo post tower hinge stop tab 306 prevents cargo post tower 288 from inclining at greater than an approximately 90-degree angle, shown in FIGS. 20-21. Preferably the hinge assembly 300 is adapted to allow the tower to swing between an upright, in-use position and a lowered storage position, which are preferably about 90 agrees (typically 85-95 degrees) apart, with a bracing feature to hold the tower in the upright position when desired. Preferably, the hinge assembly is not adapted to allow the tower to be adjusted to various positions between the upright position and the storage position; in other words the hinge assembly is typically not an adjustment for fitting various types of cargo, but is for employing the tower or storing the tower in two positions, respectively.

Cargo post tower cover 301 may be provided, and is preferably a thin piece of UHMW plastic or other abrasion resistant, cushioning or otherwise protective material. A cover 301 may be mounted to one or both sides of cargo post tower 288 to protect cargo items from damage during loading and especially during transport.

Pivotal cargo post towers 288 can be positioned flat when not in use, by pivoting the towers 288 relative to their base plates 296, and, hence, relative to the floor panel 202. This may be accomplished by using cargo post hinge assembly 300, shown in FIG. 11. When in the flat storage position, cargo post towers 288 can be secured to the floor panel with common attachment devices including bungee strap with hook end 230. When cargo post towers 288 are positioned flat and secured to floor panel 202, air friction over load carrier 200 and cargo posts 288 is reduced, compared to transporting cargo post towers 288 in an upright position upon floor panel 202.

FIGS. 16, 19, and 36-39 show to best advantage two embodiments of a depending suspension assembly, also called a "rail bracket assembly". Rail bracket assembly 310 (FIGS. 16, 36 and 37) is a generally J-hook-shaped assembly, while rail bracket assembly 264 (FIGS. 19, 38 and 39) is a generally L-hook-shaped assembly. The upper portions of the assemblies may be the same, and the lower portions (the hooks) may be interchangeable in the upper portions.

Figures 36, 37:
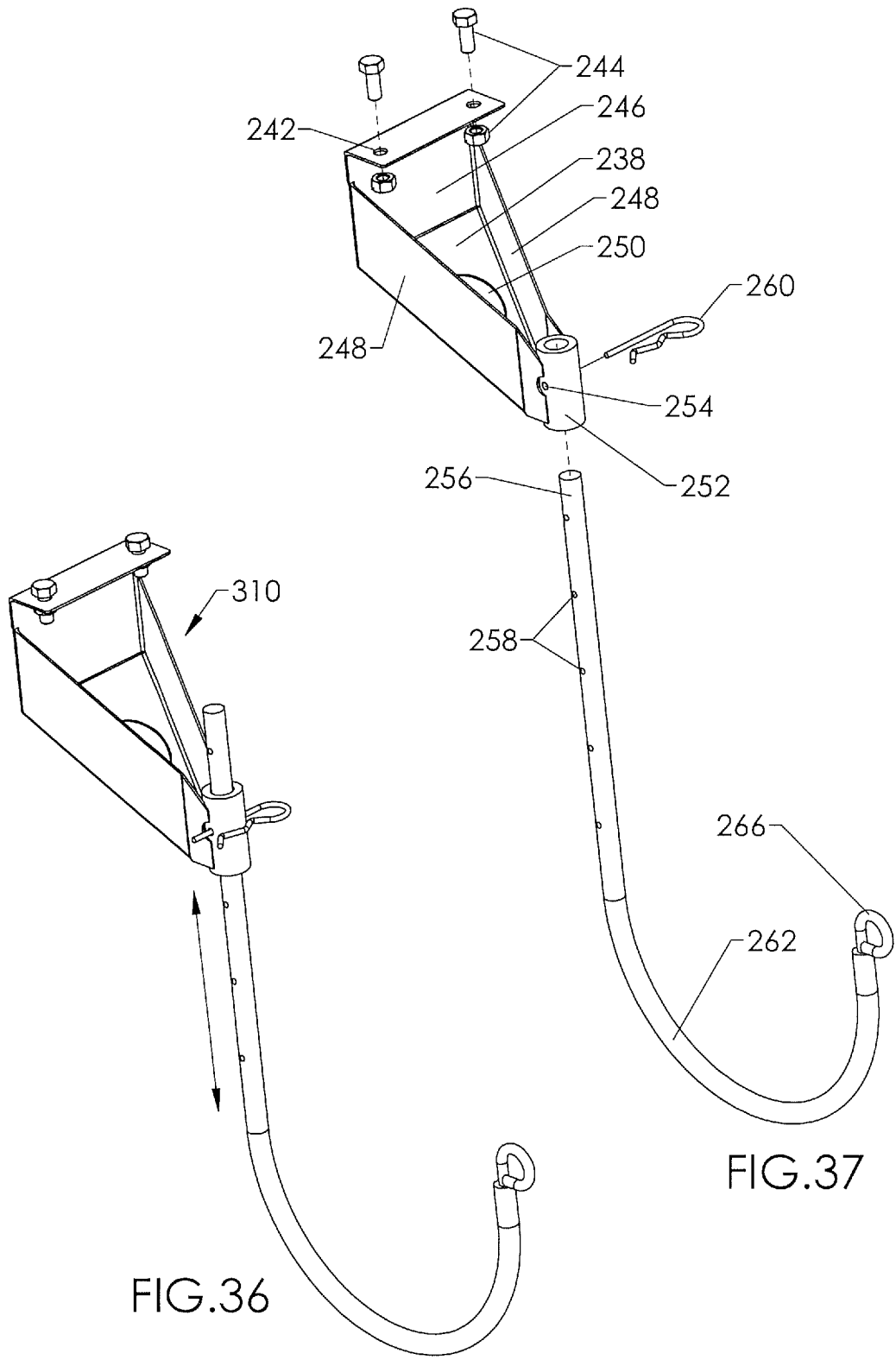
FIG. 36 is a close-up view of one embodiment of a J-shaped cargo hook rail bracket assembly, showing adjustable positioning of the top section of the J-shaped cargo hook including terminal end eyelet, positioned within the cargo hook housing, secured with lock pin.
FIG. 37 is a close-up, exploded view of the rail bracket assembly of FIG. 36.
Figures 38, 39:
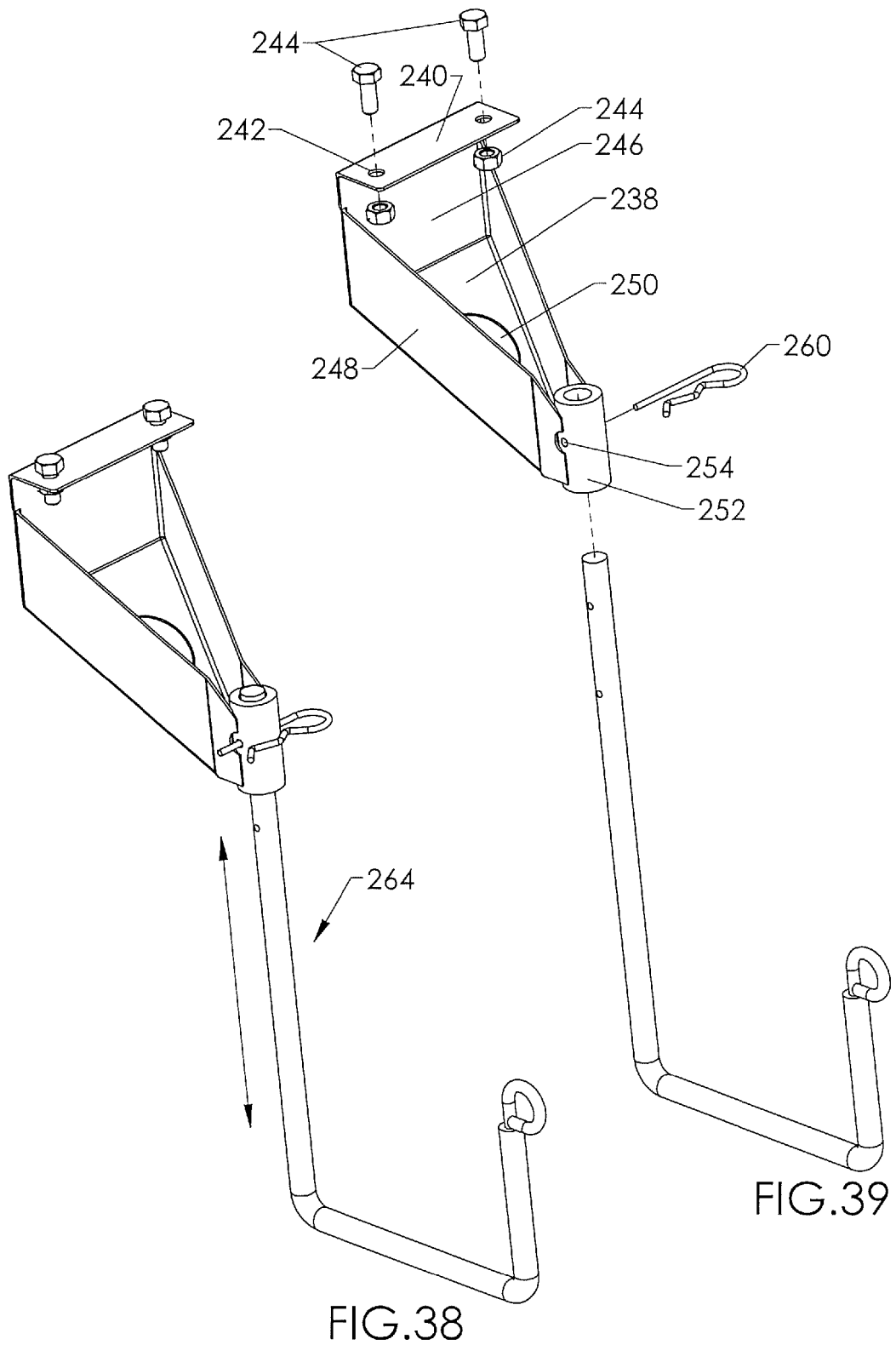
FIG. 38 is a close-up view of an alternative rail bracket assembly, showing adjustable positioning of L-shaped cargo hook top section, including terminal end eyelet, within the cargo hook housing, secured using lock pin.
FIG. 39 is a close-up, exploded view of the rail bracket assembly of FIG. 38.

The upper portion of both assembly 310 and assembly 264 may be described by referring to FIGS. 37 and 39. The upper portion may be constructed of one contiguous or molded piece of metal, mold or composite, or may be constructed of separate plates/members connected together by conventional means such as welding. Top plate 240 is attached to rear plate 246, which is attached to bottom plate 238 and left and right side plates 248. One or more panel passages 250 may be cut or otherwise provided in these plates to facilitate cargo attachment devices such as a bungee strap or ratchet strap.

Top plate 240 of the upper portion of assemblies 264, 310 may be fastened to the underside of load carrier top rail 214 using rail bracket top plate attachment hardware 244 (FIG. 16). When an assembly 264, 310 is attached to load carrier 200, side plates 248 extend outward beyond top rail 214 and left side wall 210 and right side wall 212, as best shown in FIGS. 16 and 21. The load carrier body is sized so that its top rails 214 and the left and right sides walls 210, 212 preferably do not extend out past the farthest-left and farthest-right extremities of the vehicle. Said rails 214 and walls 210, 212 are located so that their footprint (viewed from the top) is about the same or slightly less than the top surface of the roof. For example, the footprint of the cargo carrier (except for the assemblies 264, 310) is inside (FIG. 21), matching, or only very slightly beyond the outer perimeter of the roof VR (or truck-bed, as the case may be). On the other hand, assemblies 264, 310 (and especially the upper portions of the assemblies 264, 310), are sized and positioned so that the assemblies 264, 310 extend out past the perimeter (RP) of the roof (particularly, past the farthest-left and farthest-right extremities of the vehicle) and below the perimeter (and the horizontal plane, RPL in FIG. 21) of the rooftop. This enables large cargo items such as kayak 238 or ladder 236 (FIGS. 16, 17 and 19), to be carried and secured in the assemblies 264, 310 far enough away from the vehicle that damage to either cargo or vehicle is prevented. In other words, contact between cargo and vehicle during loading, unloading, and especially during transport of cargo items (particularly on rough roads) is prevented or avoided.

Hook housing 252 is located at a lower end of the upper portion of assemblies 264, 310, for slidably receiving the upper portion/shaft 256 (FIG. 37). The shaft 256 may be secured in the housing 252, for example, by a lock pin 260 inserted through pin passages 254 of the housing 252 and through any of several passages 258 through shaft 256. Thus, the length of the hook is adjustable relative to the upper portion of the assembly. On the ends of both hooks, of assemblies 264 and 310, is a terminal end eyelet 266, intended to receive attachment devices including bungee strap 230 (FIGS. 16 and 19) to assist in securing cargo items to the assembly bracket assemblies 310 and 264, and hence to load carrier 200. The end of bungee strap 230 that opposes that in eyelet 266 may hook to passages 226 or wall passages 224, for example.

As illustrated in FIG. 16, ends of kayak 228 may be connected to load carrier 200 using rail bracket assembly 310. Assembly 310 may be made from one piece of molded metal, preferably steel or heavy aluminum, or several pieces welded or formed together. As best illustrated in, and understood from, FIGS. 16, 23 and 24, the rail bracket top plate fits snugly underneath load carrier top rail 214, abutting against load carrier left side wall 210 or right side wall 212, and abutting the overhanging edge of load carrier top rail 216. Cargo hook bottom J-shaped section 262 is designed to cradle and carry cargo items with round shaped ends, such as kayak 228.

Figure 19:
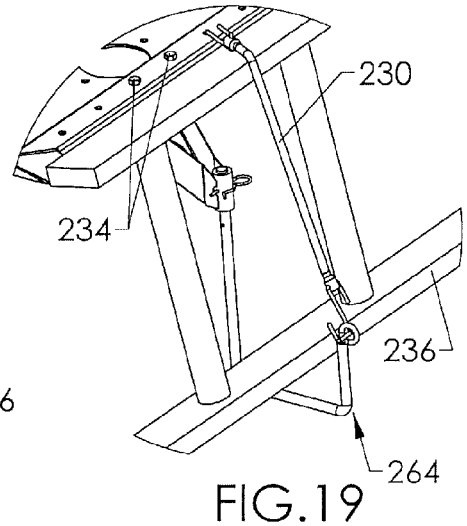
FIG. 19 is a close-up, detail view of a portion (circled in FIG. 17) of the embodiment of FIG. 17, wherein said portion comprises one end of a ladder suspended from the load carrier body using a rail bracket assembly with L-shaped cargo hooks/cradles including terminal end eyelet and attachment cord.

As best illustrated in, and understood from, FIGS. 19, 38 and 39, L-shaped rail bracket assembly 264 is designed to cradle and carry cargo items with square shaped ends, such as ladder 236.

The preferred embodiments provide a versatile system for carrying a variety of cargo items. Unlike prior art systems, the load carrier body incorporates passages in its design that accept configurable, versatile cargo containers that lock to the load carrier body, as well as cargo posts designed and movable to accept a wide range of cargo items. Thus, rather than being only cargo-specific in nature, the cargo carrying system is adaptable and adjustable, due to its many apertures and its interfitting and movable components.

The purpose of the abstract of this document is neither intended to define the invention of the application, which is measured by the claims, nor is it intended to be limiting as to the scope of the invention.

Many embodiments of the load carrier may be described as being for attachment to a vehicle roof or other exterior structure, the load carrier comprising: a tray having a floor panel, front and rear walls, and left and right side walls; a pair of cargo posts, each cargo post comprising a base plate connectable at multiple locations on said floor panel, and a tower upending from the base plate that is a generally flat plate with a longitudinal axis and having multiple apertures through the flat plate at various distances along the longitudinal axis; said multiple locations comprising at least a first and a second location near each other, each for receiving one of said cargo posts, so that the towers are positionable near each other with a space between the towers; and a fastener extending through one of said apertures of each of the towers above said cargo to connect the towers of the pair of cargo posts for retaining the cargo between the towers. The tower and the base plate of at least one of said cargo posts may be pivotal relative each other.

The tray may comprise at least one track system parallel to the floor panel, wherein at least one of said cargo posts slides along said track system, and wherein the load carrier further comprises a fastener that secures said at least one cargo post at any one of multiple locations along the track system. Said fastener may be a bolt and at least one cargo post may be rotatable on a vertical axis until said bolt is tightened to pull the cargo post tight against the floor panel. The track system may comprise a bracket system fixed to an underside of the tray having an open bottom along the length of the track system so that ice and water can flow out of the bottom of the track system. The bracket system may be fixed to an underside of the floor panel and the floor panel may comprise a slit over said bracket system, and the track system may further comprise a carriage bolt body slidable in said bracket system, wherein said fastener extends through the base plate of said at least one cargo post and through said slit in the floor panel, and is received in said carriage bolt body.

The load carrier may comprise a depending hook assembly connected to a perimeter edge of said tray. The depending hook assembly may comprise a hook extending down and out from said perimeter edge, for suspending cargo beside and generally below the tray.

The load carrier may further comprise a cargo container connected to the tray, wherein the front wall of the tray is slanted rearward over a front end of the floor panel, and wherein a front wall of the cargo container is slanted rearward and received under the slanted front wall for retaining a front end of the cargo container on the tray. The rear wall of the tray may be slanted rearward from the floor panel, wherein a rear wall of the cargo container comprises at least one portion that slants rearward and the rear wall of the cargo container extends over the slanted rear wall, wherein a tab extends from the rear wall of the cargo container through a slit in the tray at or near the rear wall of the tray, and a lock extends through the tab underneath the rear wall of the tray to lock the cargo container to a rear end of the tray.

The load carrier may comprise at least a first cargo post and a second cargo post that each have a tower and a base plate that pivot relative to each other on a hinge system, wherein the hinge system comprises a pivotal wing that retains the tower at about 90 degrees to the base plate. The load carrier may comprise at least two cargo posts that each have a tower that is rigidly and non-pivotal relative to a base plate.

The load carrier may further comprise a cargo container box removably received on the tray and two removable depending hook assemblies, each hook assembly being attachable along a rail on a perimeter edge of the tray and extending out beyond said perimeter edge and down below said perimeter. One of said hook assemblies may be located at or near a front end of the tray and one of said hook assemblies is located at or near a rear end of the tray and the two hook assemblies each receive an end of an elongated cargo item, so that the elongated cargo item is suspended parallel to, and outward from, a right or left edge of the tray. A lower end of each hook assembly may be adjustable in an upper portion of each hook assembly, to lengthen and shorten each hook assembly. A lower end of each hook assembly may be a J-shaped cradle or an L-shaped cradle.

The load carrier may comprise at least four of said cargo posts slidable and lockable in one track system that extends between a right and a left side of the tray, and at least two of the cargo posts may have towers that are pivotal to lie flat against said floor panel in a storage position. The tray preferably comprises multiple passages for receiving fasteners that connect said cargo posts to the tray, and preferably threaded receivers are fixed to an underside of the tray, the threaded receivers being adapted to connect to a bolt extending through a base plate of said cargo posts to secure the cargo post to the tray.

While there is shown and described the present preferred embodiment of the invention, it is to be distinctly understood that this invention is not limited thereto but may be variously embodied to practice within the scope of the following claims. From the foregoing description, it will be apparent that various changes may be made without departing from the spirit and scope of the invention as defined by the following claims.

The invention claimed is:

1. A load carrier for attachment to a vehicle roof or other exterior vehicle structure, the load carrier comprising:
a tray having a floor panel, front and rear walls, and left and right side walls;
a pair of cargo posts, each cargo post comprising a base plate connectable at multiple locations on said floor panel, and a tower upending from the base plate that is a generally flat plate with a longitudinal axis and having multiple apertures through the flat plate at various distances along the longitudinal axis;
said multiple locations comprising at least a first and a second location near each other, each for receiving one of said cargo posts, so that the towers are positionable near each other with a space between the towers; and
a fastener extending through one of said apertures of each of the towers above said cargo to connect the towers of the pair of cargo posts for retaining the cargo between the towers;
wherein the tower and the base plate of at least one of said cargo posts are pivotal relative to each other such that the tower lies flat against the floor panel.

2. A load carrier for attachment to a vehicle roof or other exterior vehicle structure, the load carrier comprising:
a tray having a floor panel, front and rear walls, and left and right side walls;
a pair of cargo posts, each cargo post comprising a base plate connectable at multiple locations on said floor panel, and a tower upending from the base plate that is a generally flat plate with a longitudinal axis and having multiple apertures through the flat plate at various distances along the longitudinal axis;
said multiple locations comprising at least a first and a second location near each other, each for receiving one of said cargo posts, so that the towers are positionable near each other with a space between the towers; and
a fastener extending through one of said apertures of each of the towers above said cargo to connect the towers of the pair of cargo posts for retaining the cargo between the towers;
wherein the tray comprises at least one track system parallel to the floor panel, wherein at least one of said cargo posts slides along said track system, and wherein the load carrier further comprises a fastener that secures said at least one cargo post at any one of multiple locations along the track system;
and wherein the track system comprises a bracket system fixed to an underside of the tray having an open bottom along the length of the track system so that ice and water can flow out of the bottom of the track system.

3. A load carrier as in claim 1, wherein said fastener is a bolt and at least one cargo post is rotatable on a vertical axis until said bolt is tightened to pull the cargo post tight against the floor panel.

4. A load carrier as in claim 1, wherein the bracket system is fixed to an underside of the floor panel and the floor panel comprises a slit over said bracket system, and the track system further comprising a carriage bolt body slidable in said bracket system, wherein said fastener extends through the base plate of said at least one cargo post and through said slit in the floor panel, and is received in said carriage bolt body.

5. A load carrier as in claim 1, further comprising a depending hook assembly connected to a perimeter edge of said tray, said depending hook assembly comprising a hook extending down and out from said perimeter edge, for suspending cargo beside and generally below the tray.

6. A load carrier as in claim 1, comprising at least a first cargo post and a second cargo post that each have a tower and a base plate that pivot relative to each other on a hinge system, wherein the hinge system comprises a pivotal wing that retains the tower at about 90 degrees to the base plate.

7. A load carrier as in claim 1, comprising at least two cargo posts that each have a tower that is rigid and non-pivotal relative to a base plate.

8. A load carrier as in claim 1, further comprising a cargo container connected to the tray, wherein the front wall of the tray is slanted rearward over a front end of the floor panel, and wherein a front wall of the cargo container is slanted rearward and received under the slanted front wall for retaining a front end of the cargo container on the tray.

9. A load carrier as in claim 8, wherein the rear wall of the tray is slanted rearward from the floor panel, wherein a rear wall of the cargo container comprises at least one portion that slants rearward and the rear wall of the cargo container extends over the slanted rear wall, wherein a tab extends from the rear wall of the cargo container through a slit in the tray at or near the rear wall of the tray, and a lock extends through the tab underneath the rear wall of the tray to lock the cargo container to a rear end of the tray.

10. A load carrier as in claim 1 comprising at least four of said cargo posts slidable and lockable in one track system that extends between a right and a left side of the tray.

11. A load carrier as in claim 10 wherein at least two of the cargo posts have towers that are pivotal to lie flat against said floor panel in a storage position.

12. A load carrier as in claim 1, wherein said tray comprises multiple passages for receiving fasteners that connect said cargo posts to the tray.

13. A load carrier as in claim 12, wherein threaded receivers are fixed to an underside of the tray, the threaded receivers being adapted to connect to a bolt extending through a base plate of said cargo posts to secure the cargo post to the tray.

14. A load carrier as in claim 1, further comprising a cargo container box removably received on the tray, and two removable depending hook assemblies, each hook assembly being attachable along a rail on a perimeter edge of the tray and extending out beyond said perimeter edge and down below said perimeter.

15. A load carrier as in claim 14, wherein one of said hook assemblies is located at or near a front end of the tray and one of said hook assemblies is located at or near a rear end of the tray and the two hook assemblies each receive an end of an elongated cargo item, so that the elongated cargo item is suspended parallel to, and outward from, a right or left edge of the tray.

16. A load carrier as in claim 14, wherein a lower end of each hook assembly is adjustable in an upper portion of each hook assembly, to lengthen and shorten each hook assembly.

17. A load carrier as in claim 14, wherein a lower end of each hook assembly is a J-shaped cradle.

18. A load carrier as in claim 14, wherein a lower end of each hook assembly is an L-shaped cradle.

* * * * *